United States Patent
Tani et al.

(10) Patent No.: US 10,805,864 B2
(45) Date of Patent: Oct. 13, 2020

(54) BASE STATION, MOBILE STATION, COMMUNICATION SYSTEM, AND COMMUNICATION METHOD

(71) Applicant: FUJITSU LIMITED, Kawasaki-shi, Kanagawa (JP)

(72) Inventors: Mitsuhiro Tani, Kawasaki (JP); Yoshihiro Kawasaki, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/119,124

(22) Filed: Aug. 31, 2018

(65) Prior Publication Data

US 2018/0376409 A1    Dec. 27, 2018

Related U.S. Application Data

(63) Continuation of application No. PCT/JP2016/057478, filed on Mar. 9, 2016.

(51) Int. Cl.
*H04W 48/10*     (2009.01)
*H04W 72/04*     (2009.01)
(Continued)

(52) U.S. Cl.
CPC .......... *H04W 48/10* (2013.01); *H04L 5/0048* (2013.01); *H04W 48/12* (2013.01); *H04W 72/048* (2013.01); *H04W 72/08* (2013.01); *H04L 5/0014* (2013.01); *H04W 74/0833* (2013.01); *H04W 88/12* (2013.01)

(58) Field of Classification Search
CPC .......... H04J 11/00; H04L 1/00; H04L 5/0037; H04L 5/0091; H04W 52/14; H04W 52/146; H04W 52/242; H04W 72/0413; H04W 72/042; H04W 88/08
See application file for complete search history.

(56) References Cited

U.S. PATENT DOCUMENTS

| | | | |
|---|---|---|---|
| 2014/0029562 A1 | 1/2014 | Kishiyama | |
| 2014/0044091 A1 | 2/2014 | Kishiyama | |

(Continued)

FOREIGN PATENT DOCUMENTS

| | | | |
|---|---|---|---|
| JP | 2013-9288 A | 1/2013 | |
| JP | 2013-9289 A | 1/2013 | |

(Continued)

OTHER PUBLICATIONS

International Search Report issued by the Japan Patent Office for corresponding International Patent Application No. PCT/JP2016/057478, dated May 24, 2016, with an English translation.

*Primary Examiner* — Liton Miah
(74) *Attorney, Agent, or Firm* — Myers Wolin, LLC

(57) ABSTRACT

A base station includes a controller configured to set a first cell supporting non-orthogonal multiple access wireless transmission for a plurality of mobile stations and generate a broadcast signal indicating that the non-orthogonal multiple access wireless transmission is supported in the first cell, the broadcast signal including a condition related to wireless quality between the base station and a mobile station, for performing the non-orthogonal multiple access wireless transmission in the first cell; and a transmitter configured to transmit the broadcast signal.

12 Claims, 16 Drawing Sheets

(51) Int. Cl.
    *H04W 72/08*    (2009.01)
    *H04L 5/00*    (2006.01)
    *H04W 74/08*    (2009.01)
    *H04W 48/12*    (2009.01)
    *H04W 88/12*    (2009.01)

(56) References Cited

U.S. PATENT DOCUMENTS

| | | |
|---|---|---|
| 2014/0086372 A1 | 3/2014 | Kishiyama et al. |
| 2015/0237651 A1 | 8/2015 | Nobusawa et al. |
| 2015/0312074 A1* | 10/2015 | Zhu .................... H04L 27/2627 370/329 |
| 2016/0037460 A1 | 2/2016 | Benjebbour et al. |
| 2016/0205695 A1 | 7/2016 | Kishiyama et al. |
| 2016/0219529 A1 | 7/2016 | Benjebbour et al. |
| 2017/0078973 A1* | 3/2017 | Ohwatari ............ H04L 27/2626 |
| 2018/0213366 A1* | 7/2018 | Seo .................... H04W 52/143 |
| 2019/0052309 A1* | 2/2019 | Schmidt ................ H04J 11/004 |

FOREIGN PATENT DOCUMENTS

| | | |
|---|---|---|
| JP | 2013-9290 A | 1/2013 |
| JP | 2014-204277 A | 10/2014 |
| JP | 2015-41941 A | 3/2015 |
| JP | 2015-50575 A | 3/2015 |
| WO | 2014/061537 A1 | 4/2014 |

\* cited by examiner

FIG.11

MCS TABLE 1100

| MCS INDEX | MODULATION ORDER | TBS INDEX |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 2 | 10 |
| 11 | 4 | 10 |
| 12 | 4 | 11 |
| 13 | 4 | 12 |
| 14 | 4 | 13 |
| 11 | 4 | 14 |
| 16 | 4 | 11 |
| 17 | 4 | 16 |
| 18 | 4 | 17 |
| 19 | 4 | 18 |
| 20 | 4 | 19 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | RESERVED | |
| 30 | | |
| 31 | | |

- MCS indices 0–10: NOMA-NON-ENABLED MCS
- MCS indices 11–20: NOMA-ENABLED MCS
- MCS indices 21–31: NOMA-NON-ENABLED MCS

BASE STATION, MOBILE STATION, COMMUNICATION SYSTEM, AND COMMUNICATION METHOD

CROSS REFERENCE TO RELATED APPLICATIONS

This application is a continuation application of International Application PCT/JP2016/057478, filed on Mar. 9, 2016, and designating the U.S., the entire contents of which are incorporated herein by reference.

FIELD

The embodiments discussed herein relate to a base station, a mobile station, a communication system, and a communication method.

BACKGROUND

Mobile communication systems have been known such as third generation mobile communication systems (3G), LTE corresponding to 3.9 generation mobile communication systems, LTE-Advanced corresponding to fourth generation mobile communication systems, and fifth generation mobile communication system (5G). LTE is the abbreviation for long term evolution.

Orthogonal frequency division multiple access (OFDMA) that simultaneously transmits signals of plural users within a cell, orthogonally multiplexed on a wireless resource has also been known.

Non-orthogonal multiple access (NOMA) that simultaneously transmits signals of plural users within a cell, non-orthogonally multiplexed on the same wireless resource has further been known (see, for example, Japanese Laid-Open Patent Publication No. 2013-9290, Japanese Laid-Open Patent Publication No. 2014-204277, Japanese Laid-Open Patent Publication No. 2013-9288, and Japanese Laid-Open Patent Publication No. 2013-9289).

In a wireless system including plural machine type communication devices connected, a technique that exchanges information between the devices and a base station using broadcast information including preamble sequences usable in a random access manner has been known (see, for example, International Publication No. WO 2014/061537).

SUMMARY

According to an aspect of an embodiment, a base station includes a controller configured to set a first cell supporting non-orthogonal multiple access wireless transmission for a plurality of mobile stations and generate a broadcast signal indicating that the non-orthogonal multiple access wireless transmission is supported in the first cell, the broadcast signal including a condition related to wireless quality between the base station and a mobile station, for performing the non-orthogonal multiple access wireless transmission in the first cell; and a transmitter configured to transmit the broadcast signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a diagram depicting an example of NOMA-enabled MCS and NOMA-non-enabled MCS according to the embodiment;

DESCRIPTION OF THE INVENTION

First, problems associated with the above prior arts will be discussed. With the prior arts above, throughput may not be improved by NOMA when, for example, a number of NOMA-non-enabled mobile stations or NOMA-enabled mobile stations having excessive path losses are connected to a NOMA-enabled base station.

Embodiments of a base station, a mobile station, a communication system, and a communication method according to the present disclosure will be described in detail with reference to the accompanying drawings.

Figure 1:
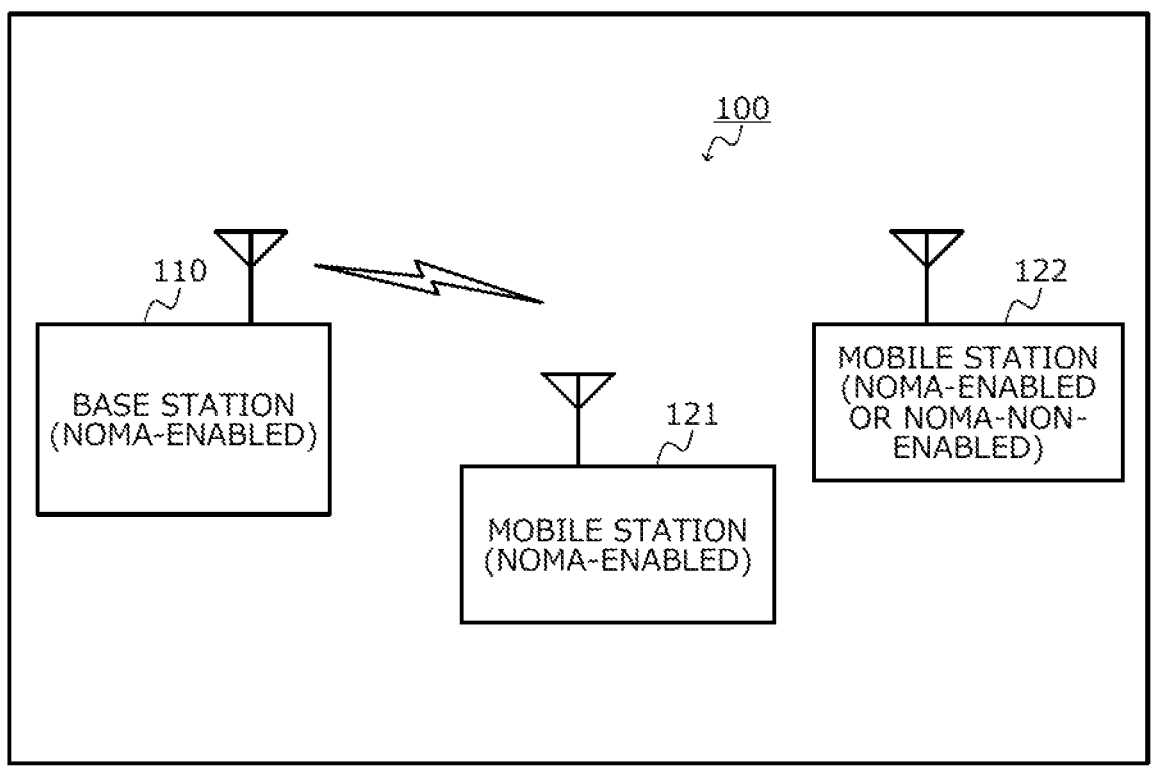
FIG. 1 is a view depicting an example of a communication system according to an embodiment.

FIG. 1 is a view depicting an example of the communication system according to an embodiment. As depicted in FIG. 1, a communication system 100 according to the embodiment includes a base station 110 and mobile stations 121 and 122. The base station 110 is a NOMA-enabled base station (wireless base station) that selects a mobile station pair from among mobile stations connected thereto, to form a cell enabling non-orthogonal multiple access (NOMA) wireless transmission for the selected mobile station pair. The cell formed by the base station 110 may include not only the NOMA-enabled cell enabling the NOMA wireless transmission but also a NOMA-non-enabled cell not enabling the NOMA wireless transmission.

The mobile stations 121 and 122 are a pair of mobile stations (wireless terminals) selected as the NOMA pair by the base station 110, among mobile stations connected to the communication system 100. The mobile station 121 has a smaller path loss in wireless transmission from the base station 110 than the mobile station 122. The mobile station 122 has a larger path loss in the wireless transmission from the base station 110 than the mobile station 121.

The path loss is, for example, a loss (free-space propagation loss) of a wireless signal in a down link (DL) from the base station 110 to the mobile stations 121 and 122. For example, the path loss is calculated from a difference of the transmission power of a reference signal wirelessly transmitted from the base station 110 and the result of measurement of the reception power by the mobile stations 121 and 122 for the reference signal.

The base station 110 selects such mobile stations 121 and 122 as the NOMA pair, multiplexes a signal to the mobile station 121 and a signal to the mobile station 122 by NOMA, and wirelessly transmits the multiplexed signal. For example, the base station 110 transmits signals to the mobile stations 121 and 122 through the same wireless resources (time resources and frequency resources) and configures the transmission power of the signal to the mobile station 122 to be greater than the transmission power of the transmission signal to the mobile station 121.

The base station 121 having a smaller path loss decodes (estimates) a replica signal of the signal to the mobile station 122, based on the reception signal from the base station 110. As described above, since the transmission power of the signal to the mobile station 122 is greater than the transmission power of the signal to the mobile station 121, the mobile station 121 is capable of decoding (estimating) the replica signal of the signal to the mobile station 122.

Based on the decoded replica signal, the mobile station 121 removes the signal destined to the mobile station 122 from the signal received from the base station 110 and decodes a remaining signal component as the signal to the mobile station 121. For example, as such a decoding process, a successive interference canceller (SIC) may be used. In this manner, since the mobile station 121 performs the decoding process corresponding to NOMA as above, the mobile station 121 has to be a mobile station (NOMA-enabled mobile station) enabling NOMA wireless transmission. As used herein, the mobile station enabling NOMA wireless transmission refers to, for example, a mobile station capable of the decoding process corresponding to NOMA as above.

On the other hand, the mobile station 122 having a larger path loss directly decodes the signal to the mobile station 122, based on the reception signal from the base station 110. Since, as described above, the transmission power of the signal to the mobile station 122 is greater than the transmission power of the signal to the mobile station 121, the mobile station 122 is capable of directly decoding the signal to the mobile station 122.

Accordingly, the mobile station 122 need not perform the decoding process corresponding to NOMA, unlike the mobile station 121. For this reason, the mobile station 122 may be a mobile station (NOMA-enabled mobile station) enabling NOMA wireless transmission or may be a mobile station (NOMA-non-enabled mobile station) not enabling NOMA wireless transmission.

In the communication system 100, the base station 110 broadcasts, within a NOMA-enabled cell, NOMA-enabled cell information indicating that the cell is NOMA-enabled. As a result, the NOMA-enabled mobile station may be connected to a NOMA-enabled cell preferentially over other NOMA-non-enabled cells. As a consequence, more NOMA-enabled mobile stations may be connected to the NOMA-enabled cell. It is thus possible to increase the proportion of the NOMA-enabled mobile stations in mobile stations connected to the NOMA-enabled cell and to increase the number of combinations of mobile stations allowing NOMA pairing in the base station 110. It is therefore possible to increase the proportion of the NOMA wireless transmissions in wireless transmissions performed by the base station 110, to thereby improve the utilization efficiency of wireless resources in the communication system 100, to consequently achieve an improvement in throughput.

The base station 110 broadcasts NOMA possible quality information indicating conditions relating to wireless qualities (e.g., path loss) between the base station 110 and mobile stations for NOMA wireless transmissions in a NOMA-enabled cell. This prevents a NOMA-enabled mobile station from connecting to a NOMA-enabled cell when the wireless quality between the NOMA-enabled mobile station and the base station 110 is too low. It is therefore possible to connect more NOMA-enabled mobile stations not having too low wireless qualities to the NOMA-enabled cell. It is thus possible to increase the proportion of the NOMA-enabled mobile stations having wireless qualities sufficient for execution of NOMA in mobile stations connected to the NOMA-enabled cell, to consequently improve the communication quality of NOMA wireless transmission. For this reason, an improvement in throughput may be achieved in the NOMA-enabled cell.

The base station 110 may broadcast NOMA-enabled preamble information indicating a specific preamble signal for the NOMA-enabled mobile stations 121 and 122 to transmit to the base station 110 in a random access procedure. This enables the NOMA-enabled mobile stations 121 and 122 to transmit the specific preamble signal to the base station 110 in the random access procedure. Accordingly, the base station 110 is capable of discriminating whether the connected mobile station 121, 122 is NOMA-enabled, based on whether the preamble signal transmitted in the random access procedure is a specific preamble signal.

The base station 110 further broadcasts NOMA-enabled frequency/MCS information indicating a specific transmission method (frequency band and/or MCS to be used) for NOMA wireless transmission in a NOMA-enabled base station cell. The transmission method includes at least one of the frequency band and MCS to be used. The base station 110 uses the above specific transmission method for NOMA wireless transmission in the NOMA-enabled base station cell.

Figure 2:
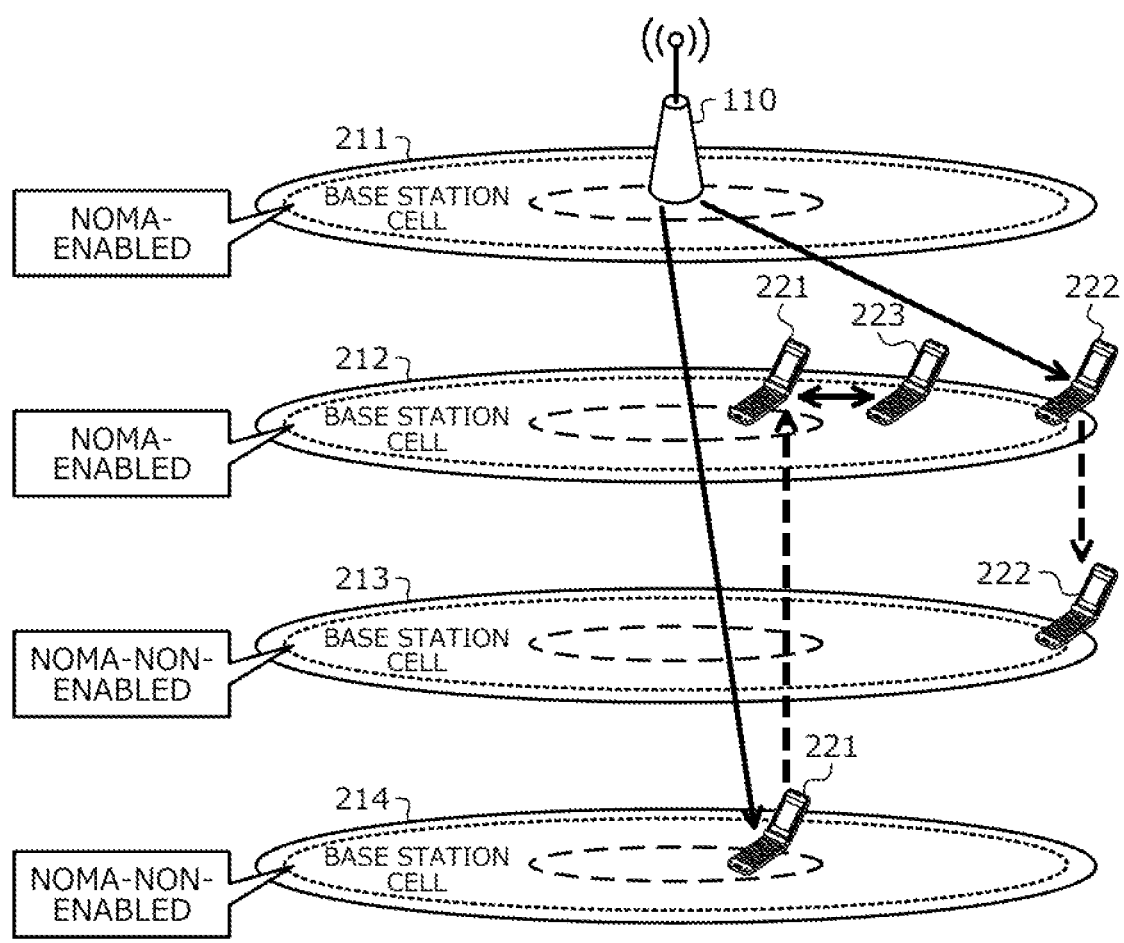
FIG. 2 is a view depicting an example of transmission of NOMA-enabled cell information and NOMA possible quality information in the communication system according to the embodiment.

FIG. 2 is a view depicting an example of transmission of NOMA-enabled cell information and NOMA possible quality information in the communication system according to the embodiment. In FIG. 2, base station cells 211 to 214 are cells formed in an overlay configuration by the base station 110 and have frequency bands different from one another.

The base station cells 211 and 212 are NOMA-enabled base station cells (first cells), while the base station cells 213 and 214 are NOMA-non-enabled base station cells (second cells).

Mobile stations 221 to 223 are located within areas of the base station cells 211 to 214 and are capable of receiving broadcast signals wirelessly transmitted in the base station cells 211 to 214. The mobile stations 221 and 222 are NOMA-enabled and, for example, correspond to any of the mobile stations 121 and 122 depicted in FIG. 1. The mobile station 223 is a NOMA-non-enabled mobile station and, for example, corresponds to the mobile station 122 depicted in FIG. 1. In the example depicted in FIG. 2, the mobile station 223 connects to the base station cell 212.

In each of the base station cells 211 to 214, the base station 110 wirelessly transmits a broadcast signal including NOMA-enabled cell information. The NOMA-enabled cell information includes information indicating whether the cell is a NOMA-enabled cell or a NOMA-non-enabled cell. The NOMA-enabled cell information may further include information indicating whether a cell formed by another base station adjacent to the base station 110 is a NOMA-enabled cell or a NOMA-non-enabled cell. The broadcast signal is system information receivable by a mobile station not connected to the base station 110.

The system information is, for example, a system information block (SIB) or a master information block (MIB). The system information is not limited hereto and may be various types of system information broadcasted to mobile stations within a cell.

For example, the base station 110 wirelessly transmits, within the base station cell 211, a broadcast signal including NOMA-enabled cell information indicating that the base station cell 211 is NOMA-enabled. The base station 110 wirelessly transmits, within the base station cell 212, a broadcast signal including NOMA-enabled cell information indicating that the base station cell 212 is NOMA-enabled. The base station 110 wirelessly transmits, within the base station cell 213, a broadcast signal including NOMA-enabled cell information indicating that the base station cell 213 is NOMA-non-enabled. The base station 110 wirelessly transmits, within the base station cell 214, a broadcast signal including NOMA-enabled cell information indicating that the base station cell 214 is NOMA-non-enabled.

The base station 110 wirelessly transmits a broadcast signal including NOMA possible quality information within each of the NOMA-enabled base station cells 211 and 212. The broadcast signal including NOMA possible quality information may be the same broadcast signal as the above broadcast signal including NOMA-enabled cell information or may be a different broadcast signal. The NOMA possible quality information is information indicating the range of communication quality allowing NOMA communication. For example, the NOMA possible quality information is a maximum value of the path loss from the base station 110 to mobile stations. Alternatively, the NOMA possible quality information may be for example a minimum value of a received signal-to-interference ratio (SIR) in a mobile station of a wireless signal from the base station 110.

For example, the base station 110 wirelessly transmits, within the base station cell 211, a broadcast signal including NOMA possible quality information indicating a path loss maximum value allowing NOMA communication in the base station cell 211. This path loss is a path loss of a mobile station terminal in the base station cell 211. The base station 110 wirelessly transmits, within the base station cell 212, a broadcast signal including NOMA possible quality information indicating a path loss maximum value allowing NOMA communication in the base station cell 212. This path loss is a path loss of a mobile station terminal in the base station cell 212. The path loss maximum values allowing NOMA communication in the base station cells 211 and 212 may be different from each other or may be the same.

The NOMA-enabled mobile stations 221 and 222 preferentially select a NOMA-enabled base station cell as a connection-destination communication cell, based on a broadcast signal wirelessly transmitted from the base station 110. For example, if there are plural connectable base station cells satisfying criteria of the wireless quality, etc., among which a NOMA-enabled base station cell is included, the mobile stations 221 and 222 select the NOMA-enabled base station cell as the connection destination.

For example, in the example depicted in FIG. 2, the mobile station 221 determines that the base station cells 211 and 212 are NOMA-enabled base station cells, based on the NOMA-enabled cell information included in the broadcast signals wirelessly transmitted in the base station cells 211 to 214. When the path losses of the mobile station 221 in the base station cells 211 and 212 are equal to or less than the path loss maximum values indicated by the NOMA possible quality information included in the broadcast signals wirelessly transmitted in the base station cells 211 and 212, in this case, the mobile station 221 may select any one of the base station cells 211 and 212 as the connection destination. In the example depicted in FIG. 2, the mobile station 221 selects the base station cell 212 as the connection destination.

Similar to the mobile station 221, the mobile station 222 determines that the base station cells 211 and 212 are NOMA-enabled base station cells. When the path losses of the mobile station 222 in the base station cells 211 and 212 are greater than the path loss maximum values indicated by the NOMA possible quality information included in the broadcast signals wirelessly transmitted in the base station cells 211 and 212, respectively, in this case, the mobile station 222 selects neither the base station cell 211 nor the base station cell 212 as the connection destination but instead selects any one of the base station cells 213 and 214. In the example of FIG. 2, the mobile station 222 selects the base station 213 as the connection destination.

Since, for example, the mobile stations 221 and 223 connect to the base station cell 212, the base station 110 performs NOMA wireless transmission in the base station cell 212, example, with the mobile stations 221 and 223 being paired.

As depicted in FIG. 2, the base station 110 broadcasts NOMA-enabled cell information in the base station cells so that NOMA-enabled mobile stations (e.g., mobile stations 221 and 222) preferentially select the NOMA-enabled base station cell 221, 212 as the connection destination. It thus becomes possible to accommodate more NOMA-enabled mobile stations in the NOMA-enabled base station cells 211 and 212 and to use more wireless resources for NOMA communication. It is therefore possible to improve the utilization efficiency of the wireless resources, achieving an improvement in throughput of the entire communication system 100.

The base station 110 broadcasts NOMA possible quality information in NOMA-enabled base station cells so that if the reception quality indicated by the NOMA possible quality information is not satisfied, NOMA-enabled mobile stations do not select the NOMA-enabled base station cell as the connection destination. This may prevent a NOMA-enabled mobile station having a low communication quality in a NOMA-enabled base station cell from uniquely selecting the NOMA-enabled base station cell as the connection destination.

Since in this case as well, the NOMA-non-enabled mobile station 223, for example, may select a NOMA-enabled base station cell irrespective of the NOMA-enabled cell information or the NOMA possible quality information, the base station 110 may select a mobile station pair to perform NOMA transmission.

For example, the base station 110 may use, as the NOMA possible quality information, a threshold value Th #1 for a mobile station having a small path loss with the base station 110 and a threshold value Th #2 for a mobile station having a large path loss with the base station 110. The threshold value Th #2 is a value greater than the threshold value Th #1.

The mobile station (e.g., mobile station 121) having a small path loss with the base station 110 is, for example, a NOMA-enabled mobile station located relatively close to the base station 110. By connecting more mobile stations having small path losses with the base station 110 to NOMA-enabled base station cells of the base station 110, it becomes possible to increase the parameter of candidates for NOMA communication pairing.

The mobile station (e.g., mobile station 122) having a large path loss between it and the base station 110 is for example a mobile station located relatively far from the base station 110 (e.g., in the vicinity of cell ends of the base station 110). Due to unsuitability for being a mobile station to be paired in NOMA communication, a mobile station having too large of a path loss with the base station 110 is preferably prevented from connecting to a NOMA-enabled base station cell.

The reason that a mobile station having too large of a path loss with the base station 110 is unsuitable for a mobile station to be paired in the NOMA communication will be described. With increasing proximity of a mobile station to a cell end of the base station 110, the path loss increases. For this reason, most of the wireless resources used for wireless transmission of signals to such a mobile station are dedicated only to the wireless transmission of the signals to the mobile station. The wireless resource is equivalent to, for example, a physical resource block in LTE. The mobile station (e.g., mobile station 121) having a small path loss with the base station 110 is, for example, a NOMA-enabled mobile station located relatively close to the base station 110.

In a case where a signal of such a mobile station having a large path loss is non-orthogonally multiplexed with a signal of a mobile station having a small path loss, the transmission power assigned to the mobile station having a large path loss decreases, whereby the reception signal power may fall below a desired value. At the same time, a sufficient transmission power may not be assigned for signal transmission to the mobile station having a small path loss.

To overcome this situation, in the communication system 100, a NOMA-enabled mobile station having a path loss greater than the threshold value Th #2 included in the NOMA possible quality information notified by the broadcast signal, for example, does not select a NOMA-enabled base station cell as the connection destination.

As depicted in FIG. 2, in the cell selection logic of the mobile stations 221 and 222, a mobile station having a small path loss among NOMA-enabled mobile stations is preferentially assigned to a NOMA-enabled base station cell, and base station cells of NOMA-enabled mobile stations are separated from base station cells of NOMA-non-enabled mobile stations, thereby enabling the NOMA application efficiency to be increased, allowing the overall throughput of the communication system 100 to be improved. Increasing the NOMA application efficiency means, for example, increasing the probability that the pair for NOMA wireless transmission is established, to thereby enlarge the proportion of NOMA wireless transmission in the overall wireless transmission performed by the base station 110.

Although a case has been described where the base station 110 wirelessly transmits a broadcast signal including NOMA-enabled cell information in each of the base station cells 211 to 214, such a configuration is not limitative. For example, configuration may be such that the base station 110 may wirelessly transmit a broadcast signal including NOMA-enabled cell information in the NOMA-enabled base station cells 211 and 212, and does not wirelessly transmit the broadcast signal including NOMA-enabled cell information in the NOMA-non-enabled base station cells 213 and 214. In this case, the mobile stations 221 and 222 determine that a base station cell having a broadcast signal not including NOMA-enabled cell information is NOMA-non-enabled.

Figure 3:
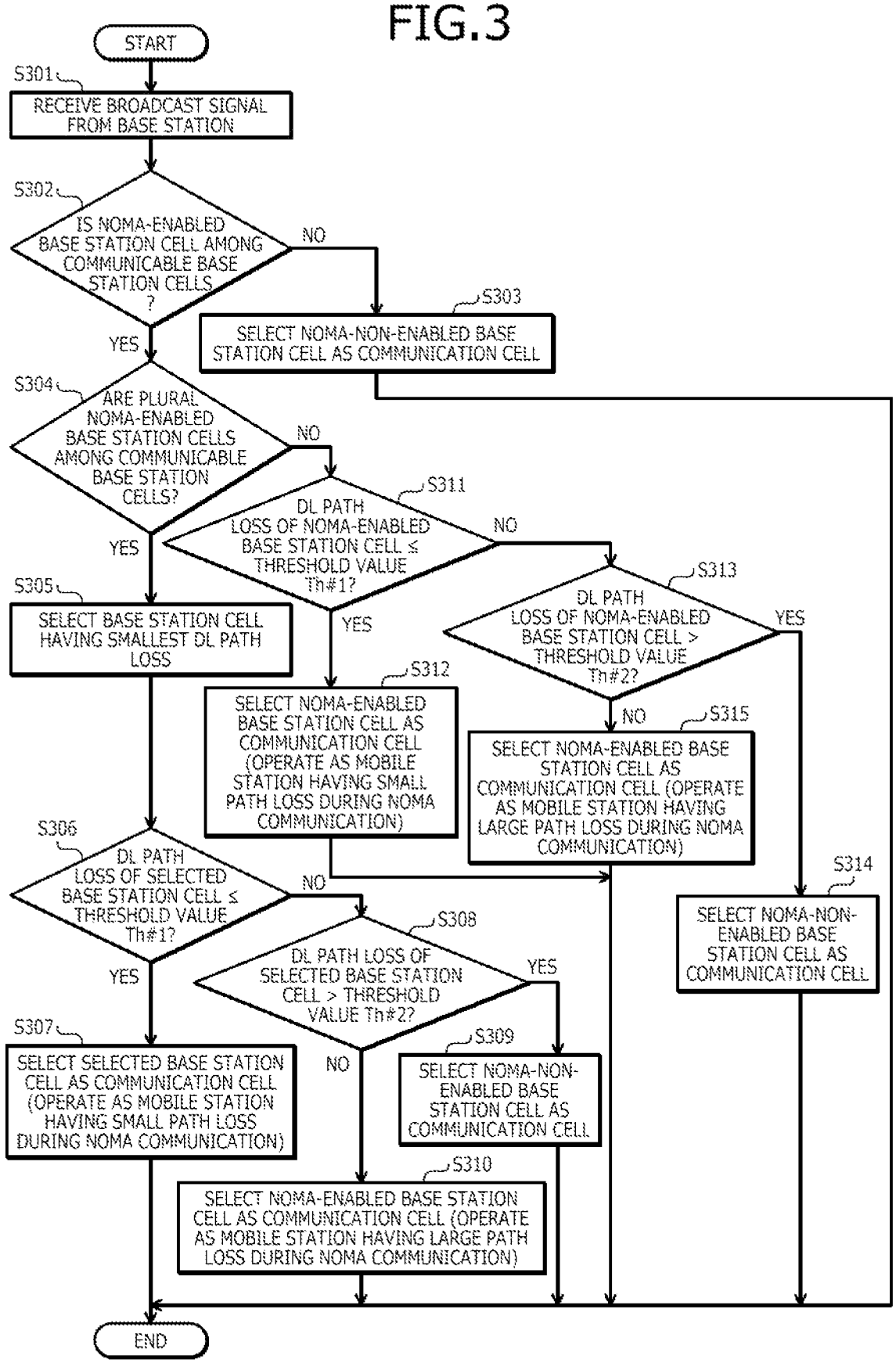
FIG. 3 is a flowchart depicting an example of cell selection processing by a NOMA-enabled mobile station according to the embodiment.

FIG. 3 is a flowchart depicting an example of cell selection processing by a NOMA-enabled mobile station according to the embodiment. Although processing by the NOMA-enabled mobile station 221 is described in FIG. 3, processing by other NOMA-enabled mobile stations (e.g., mobile station 222) is similar. The NOMA-enabled mobile station 221 executes operations depicted in FIG. 3, for example, as cell selection processing for selecting a connection-destination communication cell.

First, the mobile station 221 receives from the base station 110, a broadcast signal (system information) for each of the base station cells (step S301). Next, based on NOMA-enabled cell information included in the broadcast signals received at step 301, the mobile station 221 determines whether there is a NOMA-enabled base station cell among communicable base station cells (step S302). A communicable base station cell refers to, for example, a base station cell for which the result of measurement of the communication quality by the mobile station 221 satisfies a predetermined quality.

At step S302, when there is no NOMA-enabled base station cell among the communicable base station cells (step S302: NO), the mobile station 221 proceeds to step S303. That is, the mobile station 221 selects, as a communication cell, a NOMA-non-enabled base station cell among the communicable base station cells (step S303), ending a series of operations.

At step S302, when there is a NOMA-enabled base station cell among the communicable base station cells (step S302: YES), the mobile station 221 determines whether there are plural NOMA-enabled base station cells among the communicable base station cells (step S304). When there are plural NOMA-enabled base station cells (step S304: YES), the mobile station 221 selects a base station cell having a smallest DL path loss in the base station 221 among the plural NOMA-enabled base station cells (step S305).

Next, the mobile station 221 determines whether the DL path loss at the mobile station 221 in the base station cell selected at step S305 is at most the threshold value Th #1 (step S306). The threshold value Th #1 is a threshold value indicated by the NOMA possible quality information included in the broadcast signal received at step S301.

At step S306, when the path loss is equal to or less than the threshold value Th #1 (step S306: YES), the mobile station 221 selects the base station cell (NOMA-enabled) selected at step S305 as the communication cell (step S307), ending a series of operations. In this case, at the time of NOMA communication in the base station cell selected for connection at step S307, the mobile station 221 acts as the mobile station 121 having a smaller path loss in the NOMA pair described above.

At step S306, when the path loss is not equal to or less than the threshold value Th #1 (step S306: NO), the mobile station 221 proceeds to step S308. That is, the mobile station 221 determines whether the DL path loss at the mobile station 221 in the base station cell selected at step S305 is greater than the threshold value Th #2 (step S308). The threshold value Th #2 is a threshold value indicated by the NOMA possible quality information included in the broadcast signal received at step S301 and is, for example, a threshold value that is greater than the threshold value Th #1.

If at step S308 the path loss is greater than the threshold value Th #2 (step S308: YES), the mobile station 221 selects a NOMA-non-enabled base station cell as a communication cell among communicable base station cells (step S309), ending a series of operations. When the path loss is not greater than the threshold value Th #2 (step S308: NO), the mobile station 221 selects the base station cell (NOMA-enabled) selected at step S305 as the communication cell (step S310), ending a series of operations. In this case, at the time of NOMA communication in the base station cell selected for connection at step S307, the mobile station 221 acts as the mobile station 122 having a larger path loss in the NOMA pair described above.

At step S304, when there is no plural NOMA-enabled base station cell (step S304: NO), the mobile station 221 goes to step S311. That is, the mobile station 221 determines whether the DL path loss at the mobile station 221 of a single communicable, NOMA-enabled base station cell is at most the threshold value Th #1 (step S311). When the path loss is equal to or less than the threshold value Th #1 (step S311: YES), the mobile station 221 selects the single communicable, NOMA-enabled base station cell as the communication cell (step S312), ending a series of operations. In this case, at the time of NOMA communication in the base station cell selected for connection at step S312, the mobile station 221 acts as the mobile station 121 having a smaller path loss in the NOMA pair described above.

At step S311, when the path loss is not equal to or less than the threshold value Th #1 (step S311: NO), the mobile station 221 proceeds to step S313. That is, the mobile station 221 determines whether the DL path loss at the mobile station 221 in a single communicable, NOMA-enabled base station cell is greater than the threshold value Th #2 (step S313).

At step S313, when the path loss is greater than the threshold value Th #2 (step S313: YES), the mobile station 221 selects a NOMA-non-enabled base station cell as the communication cell among communicable base station cells (step S314), ending a series of operations. When the path loss is not greater than the threshold value Th #2 (step S313: NO), the mobile station 221 selects a single communicable, NOMA-enabled base station cell as the communication cell (step S315), ending a series of operations. In this case, at the time of NOMA communication in the base station cell selected for connection at step S315, the mobile station 221 acts as the mobile station 122 having a larger path loss in the NOMA pair described above.

As depicted in FIGS. 1 to 3, the base station 110 gives notification, within the NOMA-enabled base station cells 211 and 212, of being NOMA-enabled and of wireless quality conditions for NOMA application. This enables more NOMA-enabled mobile stations whose wireless quality is not too low (e.g., whose path loss is equal to or less than Th #2) to connect to the NOMA-enabled base station cells 211 and 212. For this reason, the throughput in the communication system 100 may be increased by NOMA.

Figure 4:
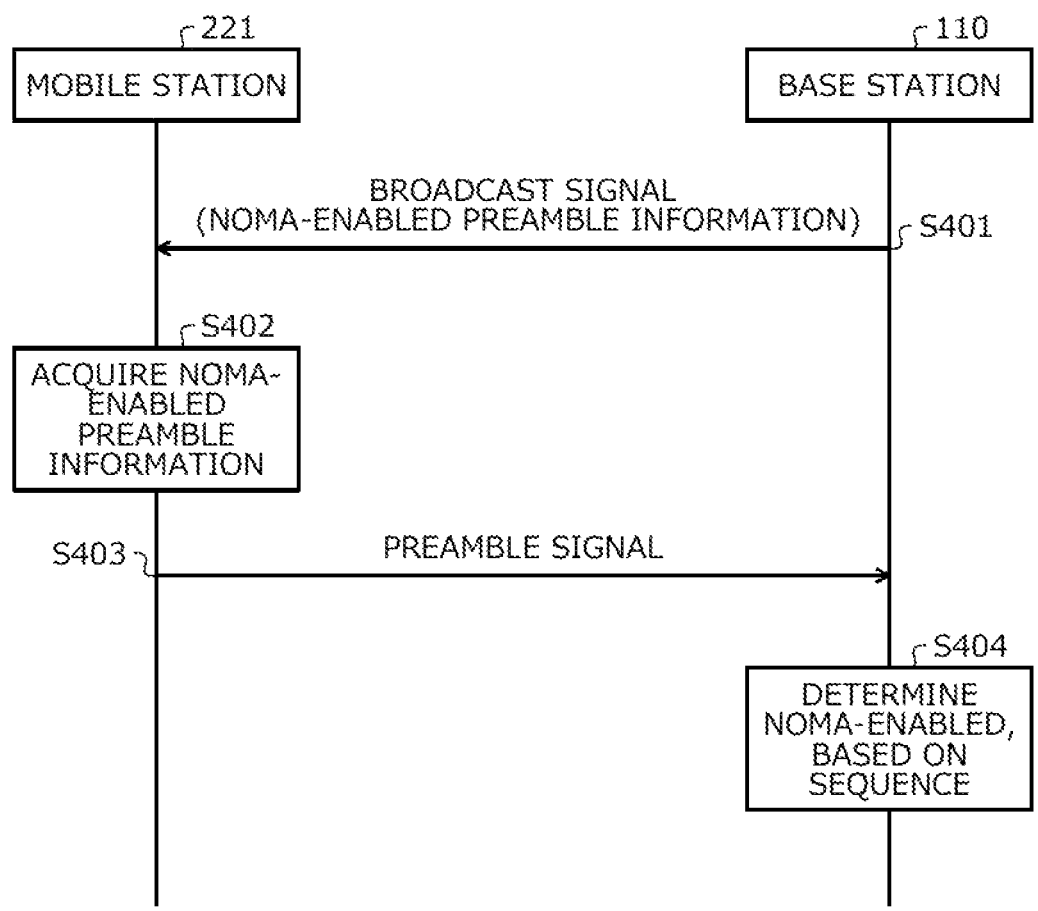
FIG. 4 is a sequence diagram depicting an example of transmission processing of a preamble signal in the communication system according to the embodiment.

FIG. 4 is a sequence diagram depicting an example of transmission processing of a preamble signal in the communication system according to the embodiment. In the communication system 100 of the embodiment, operations depicted in FIG. 4, for example, are executed. Although in FIG. 4, processing by the NOMA-enabled mobile station 221 is described, processing of other NOMA-enabled mobile stations (e.g., mobile station 222) is similar.

First, the base station 110 wirelessly transmits, within each of the base station cells 211 to 214, a broadcast signal including NOMA-enabled preamble information (step S401). The NOMA-enabled preamble information is information indicating a sequence (identification information) of a preamble signal to be transmitted in a random access procedure using physical random access channel (PRACH).

Next, the mobile station 221 acquires NOMA-enabled preamble information from the broadcast signal wirelessly transmitted from the base station 110 at step S401 (step S402). For example, the mobile station 221 acquires NOMA-enabled preamble information from the broadcast signal wirelessly transmitted from the base station 110 in a base station cell of the base station 110, selected as the connection-destination communication cell by the process depicted in FIG. 3. As a result, the sequence may be obtained of a preamble signal to be transmitted in the random access procedure for connection to a base station cell to which the NOMA-enabled mobile station 221 is connected.

Next, the mobile station 221 selects a sequence from among the preamble signal sequences in the random access procedure indicated by the NOMA-enabled preamble information acquired at step S402. The mobile station 221 then generates a preamble signal in the random access procedure based on the selected sequence and wirelessly transmits the generated preamble signal as a random access request (Msg1) to the base station 110 using PRACH (step S403).

Next, the base station 110 determines that the mobile station 221 is NOMA-enabled, based on the sequence of the preamble signal transmitted from the mobile station 221 at step S403 (step S404). The base station 110 and the mobile station 221 perform transmission/reception of Msg2 and subsequent random access requests in the random access procedure and thereby, complete connection of the mobile station 221 to a base station cell of the base station 110.

Since the base station 110 has determined at step S404 that the mobile station 221 connected to the cell of the base station 110 is NOMA-enabled, the base station 110 adds the mobile station 221 to candidates for the mobile station 121 having a smaller path loss in the NOMA communication pair.

Figure 5:
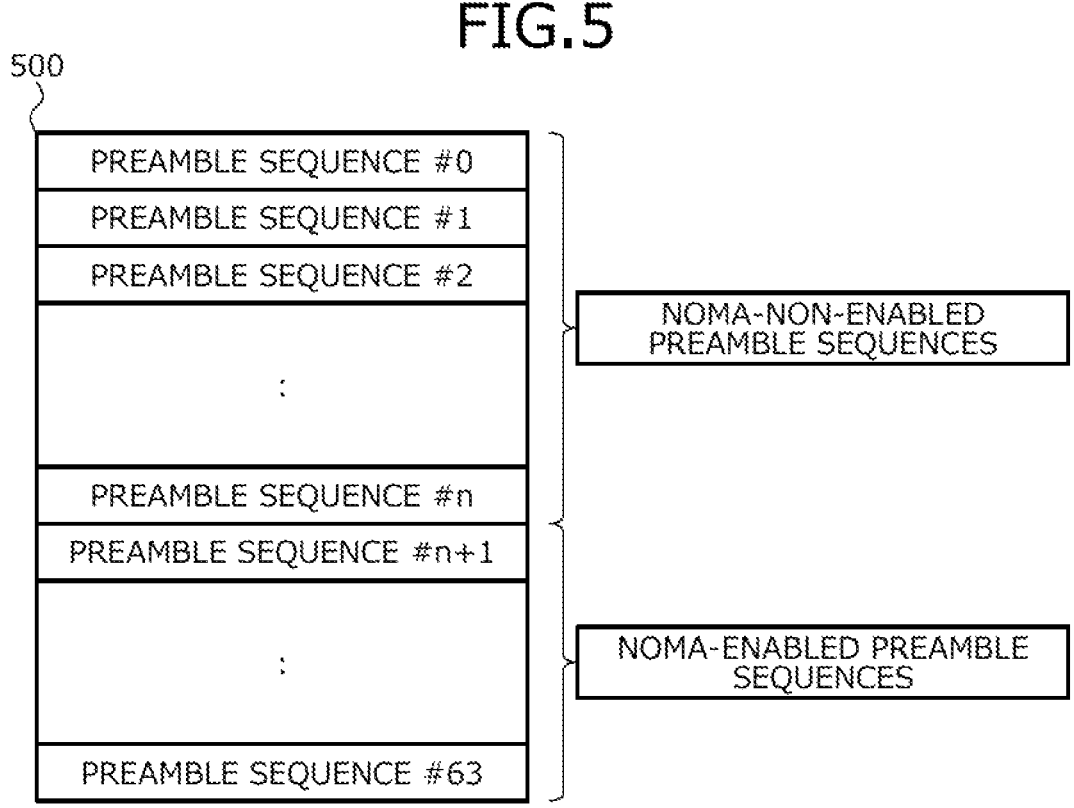
FIG. 5 is a diagram depicting an example of NOMA-enabled preamble signal sequences and NOMA-non-enabled preamble signal sequences according to the embodiment.

FIG. 5 is a diagram depicting an example of NOMA-enabled preamble signal sequences and NOMA-non-enabled preamble signal sequences according to the embodiment. A sequence list 500 depicted in FIG. 5 depicts preamble signal sequences usable as random access requests in the random access procedure for connection to a NOMA-enabled base station cell of the base station 110.

As depicted in the sequence list 500, the random access procedure preamble signal sequences in a base station cell include 64 sequences with different cyclic shifts. In the example depicted in FIG. 5, the 64 sequences are preamble sequences #0 to #63.

Among the 64 sequences, the preamble sequences #0 to #n are configured as NOMA-non-enabled preamble sequences, while the preamble sequences # n+1 to #63 are configured as NOMA-enabled preamble sequences. "n" is, for example, natural numbers 0 to 62.

In this case, using broadcast signals, the base station 110 transmits, as the NOMA-enabled preamble information described above, information capable of identifying the NOMA-enabled preamble sequences # n+1 to #63. For example, the base station 110 transmits, as the NOMA-enabled preamble information, information enumerating the preamble sequences # n+1 to #63.

As an alternative, the base station 110 may transmit, as the NOMA-enabled preamble information, n (or n+1) representative of a boundary between NOMA-non-enabled use and NOMA-enabled use, for example. In this case, based on n (or n+1) indicated by the NOMA-enabled preamble information, the base stations 221 and 222 determine that the preamble sequences # n+1 to #63 are NOMA-enabled preamble signal sequences.

For example, at the time of connecting to a NOMA-enabled base station cell of the base station 110, the NOMA-enabled mobile stations 221 and 222 select any one of the preamble sequences # n+1 to #63 identified by the NOMA-enabled preamble information. The mobile stations 221 and 222 use, as the random access request (Msg1) in the random access procedure, a preamble signal based on the selected preamble sequence.

The base station 110 acquires a preamble signal sequence transmitted in the random access procedure from the mobile station 221, 222 connected to a cell of the base station 110. Since the acquired sequence is included in the preamble sequences # n+1 to #63, the base station 110 determines that the mobile station 221, 222 is NOMA-enabled.

Figure 6:
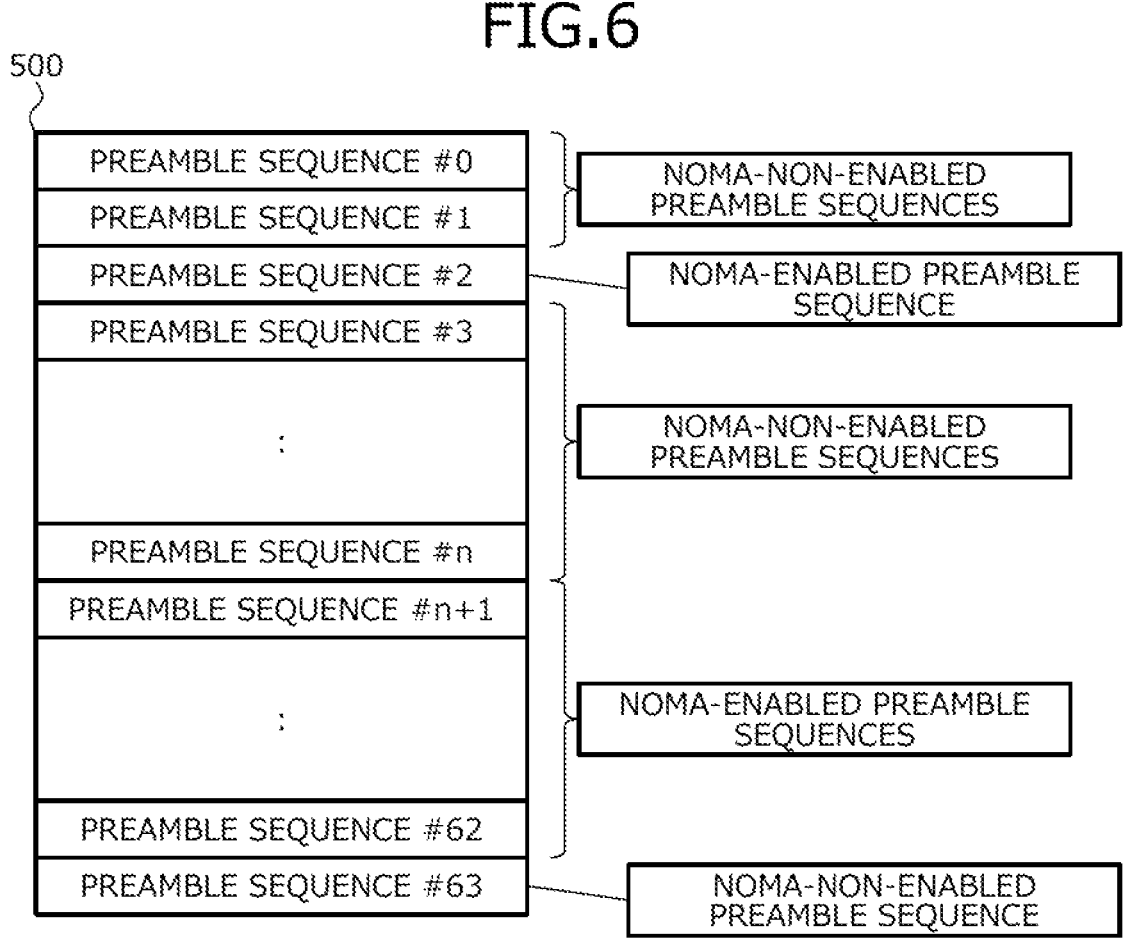
FIG. 6 is a diagram depicting another example of NOMA-enabled preamble signal sequences and NOMA-non-enabled preamble signal sequences according to the embodiment.

FIG. 6 is a diagram depicting another example of NOMA-enabled preamble signal sequences and NOMA-non-enabled preamble signal sequences according to the embodiment. In FIG. 6, parts similar to those depicted in FIG. 5 are designated by the same reference numerals and will not again be described.

In the example depicted in FIG. 6, among 64 sequences, preamble sequences #0, #1, #3 to # n, and #63 are configured as NOMA-non-enabled preamble sequences. Preamble sequences #2 and # n+1 to #62 are configured as NOMA-enabled preamble sequences. As depicted in FIGS. 5 and 6, a method of allocating 64 sequences to NOMA-non-enabled preamble sequences and NOMA-enabled preamble sequences may be an arbitrary allocation method.

Figure 7:
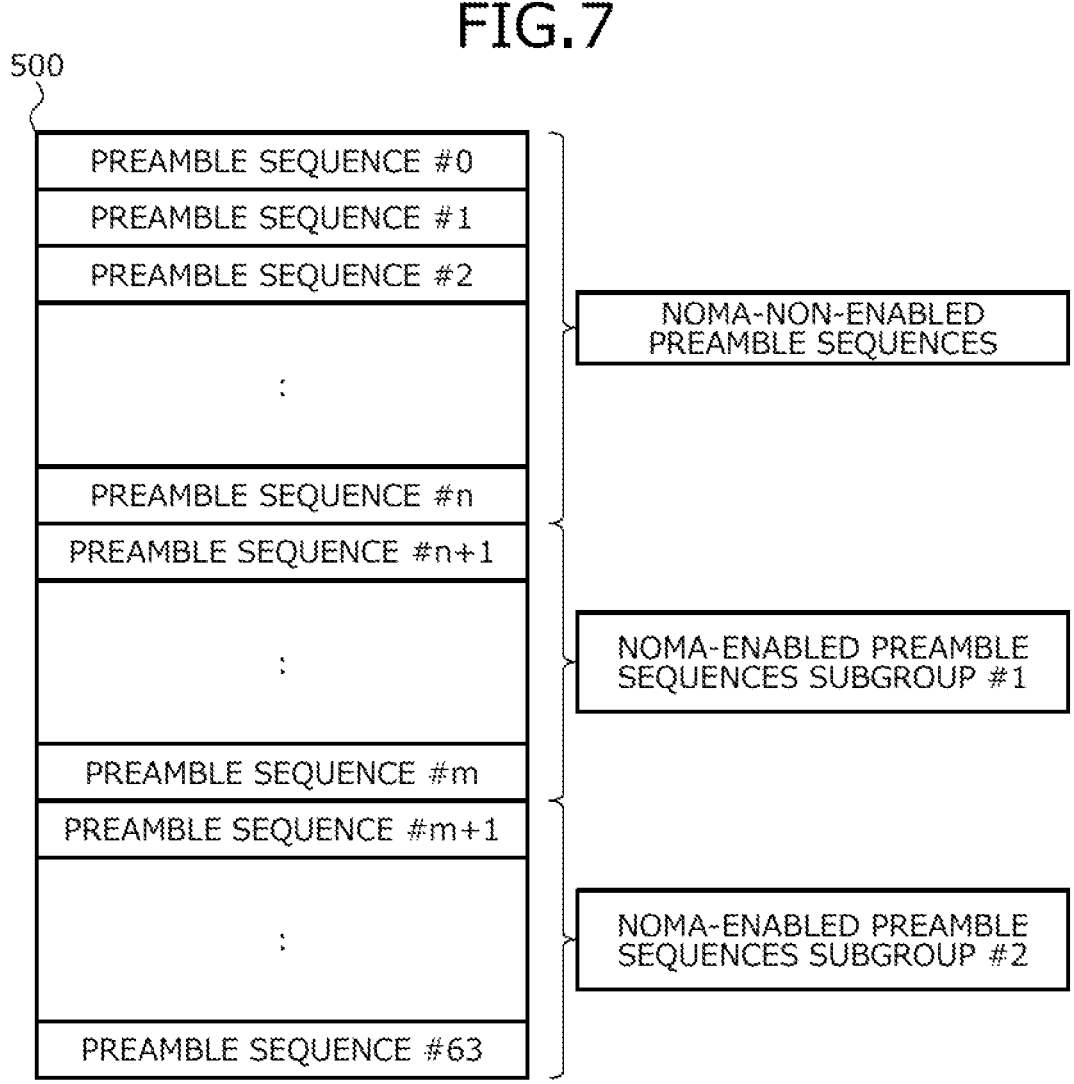
FIG. 7 is a diagram depicting still another example of NOMA-enabled preamble signal sequences and NOMA-non-enabled preamble signal sequences according to the embodiment.

FIG. 7 is a diagram depicting still another example of NOMA-enabled preamble signal sequences and NOMA-non-enabled preamble signal sequences according to the embodiment. In FIG. 7, parts similar to those depicted in FIGS. 5 and 6 are designated by the same reference numerals and will not again be described.

In the example depicted in FIG. 7, among 64 sequences, preamble sequences #0 to # n are configured as NOMA-non-enabled preamble sequences, while preamble sequences # n+1 to #63 are configured as NOMA-enabled preamble sequences. Furthermore, in the example depicted in FIG. 7, among the preamble sequence # n+1 to #63, the preamble sequences # n+1 to # m are configured as a subgroup #1 of the NOMA-enabled preamble sequences. The preamble sequences # m+1 to #63 are configured as a subgroup #2 of the NOMA-enabled preamble sequences. "m" is, for example, natural numbers n+2 to 62.

In this case, using broadcast signals, the base station 110 transmits, as the NOMA-enabled preamble information described above, information capable of identifying a sequence of the NOMA-enabled subgroup #1 and a sequence of the NOMA-enabled subgroup #2. For example, the base station 110 transmits, as the NOMA-enabled preamble information, information enumerating the preamble sequences # n+1 to # m of the subgroup #1 and the preamble sequences # m+1 to #63 of the subgroup #2 in a distinguishable manner.

Alternatively, the base station 110 may transmit, for example, as the NOMA-enabled preamble information, n (or n+1) representative of a boundary between the NOMA-non-enabled use and the NOMA-enabled use and m (or m+1) representative of a boundary between the subgroup #1 and the subgroup #2. In this case, based on n (or n+1) indicated by the NOMA-enabled preamble information, the base stations 221 and 222 determine that the preamble sequences # n+1 to #63 are NOMA-enabled preamble signal sequences. Based on m (or m+1) indicated by the NOMA-enabled preamble information, the mobile stations 221 and 222 determine that the preamble sequences # n+1 to # m belong to the subgroup #1 and that the preamble sequences # m+1 to #63 belong to the subgroup #2.

The preamble sequences of the subgroup #1 are sequences of preamble signals that are NOMA-enabled and that are to be transmitted in the PRACH random access procedure by a mobile station whose DL communication quality with the base station 110 is equal to or higher than a predetermined quality. The preamble sequences of the subgroup #1 are sequences of preamble signals that are NOMA-enabled and that are to be transmitted in the PRACH random access procedure by a mobile station whose DL communication quality with the base station 110 is lower than the predetermined quality.

For example, the DL communication quality being equal to or higher than a predetermined quality may refer to the DL path loss (transmission path loss) being equal to or less than a threshold value X[DB], whereas the DL communication quality being lower than the predetermined quality may refer to the DL path loss being more than the threshold value X[DB]. As an alternative, the DL communication quality being equal to or higher than a predetermined quality may refer to the DL SIR being equal to or more than a threshold value Y[DB], whereas the DL communication quality being lower than the predetermined quality may refer to the DL SIR being less than the threshold value Y[DB].

As depicted in FIG. 7, the NOMA-enabled PRACH preamble sequences are divided and configured into two subgroups so that the NOMA-enabled mobile station selects a preamble sequence of a subgroup in accordance with the DL path loss. As a result, the base station 110 may be notified indirectly not only of whether to be NOMA-enabled but also of immediate selectability as a pair terminal upon the NOMA transmission.

Figure 8:
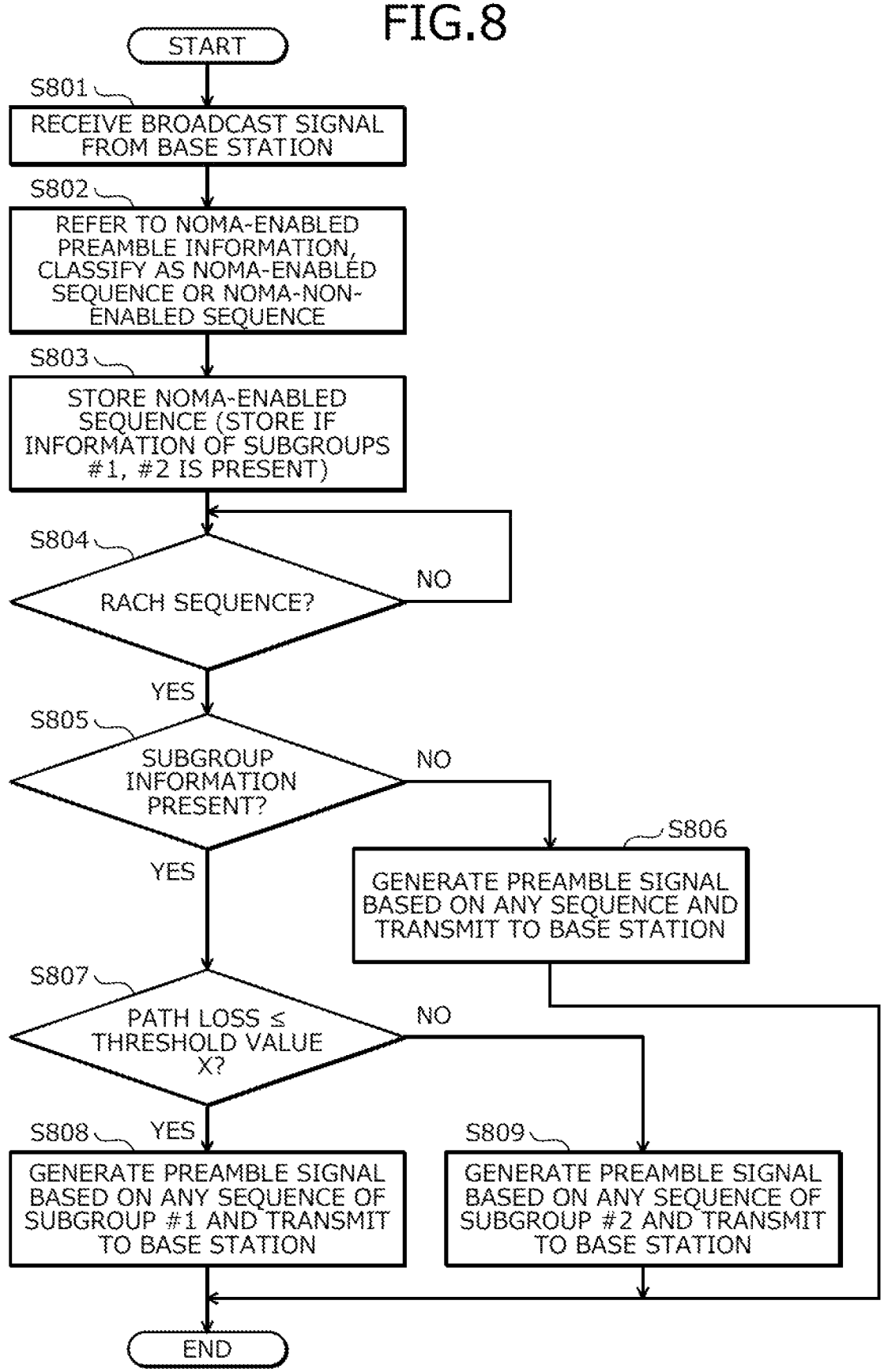
FIG. 8 is a flowchart depicting an example of preamble signal transmission processing by the NOMA-enabled mobile station according to the embodiment.

FIG. 8 is a flowchart depicting an example of preamble signal transmission processing by the NOMA-enabled mobile station according to the embodiment. Although in FIG. 8, processing of the NOMA-enabled mobile station 221 is described, processing of another NOMA-enabled mobile station (e.g., mobile station 222) is similar. For example, the NOMA-enabled mobile station 221 according to the embodiment selects a base station cell as the communication cell through the operations depicted in FIG. 3, and thereafter executes operations depicted in FIG. 8.

First, the mobile station 221 receives a broadcast signal from the base station 110 in a base station cell selected as the communication cell (step S801). Next, the mobile station 221 refers to NOMA-enabled preamble information included in the broadcast signal received at step S801 and classifies the sequences into the NOMA-enabled sequence and the NOMA-non-enabled sequence (step S802).

Next, the mobile station 221 stores to a memory of the mobile station 221, the NOMA-enabled sequences classified at step S802 (step S803). At step S803, when the NOMA-enabled preamble information includes information of subgroups (see, e.g. FIG. 7), the mobile station 221 stores the subgroup information to the memory of the mobile station 221.

Next, the mobile station 221 determines whether a RACH sequence (communication request) for a base station cell selected as the communication cell has occurred (step S804), and waits until the RACH sequence occurs (step S804: NO). The random access channel (RACH) sequence occurs based on the communication request from the mobile station 221 requesting communication between the mobile station 221 and the base station 110. At step S804, when the RACH sequence has occurred (step S804: YES), the mobile station 221 determines whether there is subgroup information stored at step S803 (step S805).

At step S805, when the subgroup information is absent (step S805: NO), the mobile station 221 selects a sequence from among the NOMA-enabled sequences stored at step S803. The mobile station 221 then generates a preamble signal based on the selected sequence and transmits the preamble signal to the base station 110 (step S806), ending a series of operations.

At step S805, when the subgroup information is present (step S805: YES), the mobile station 221 measures a DL path loss in a base station cell selected as the communication cell. The mobile station 221 then determines whether the measured path loss is at most the threshold value X (step S807).

At step S807, when the path loss is equal to or less than the threshold value (step S807: YES), the mobile station 221 selects a sequence from among the sequences of the NOMA-enabled subgroup #1 stored at step S803. The mobile station 221 then generates a preamble signal based on the selected sequence and transmits the preamble signal to the base station 110 (step S808), ending a series of operations.

At step S807, when the path loss is not equal to or less than the threshold value X (step S807: NO), the mobile station 221 selects a sequence from among the sequences of the NOMA-enabled subgroup #2 stored at step S803. The mobile station 221 then generates a preamble signal based on the selected sequence and transmits the preamble signal to the base station 110 (step S809), ending a series of operations.

As described in FIGS. 4 to 8, the broadcast signal (system information) transmitted from the base station 110 may include NOMA-enabled preamble information indicating a PRACH preamble signal sequence to be selected by the NOMA-enabled mobile station.

The NOMA-enabled mobile stations 221 and 222 select a sequence from among the NOMA-enabled sequences indicated by the NOMA-enabled preamble information included the broadcast information transmitted from the base station 110. The mobile stations 221 and 222 then generates a PRACH preamble signal by using the selected sequence and transmits the generated preamble signal to the base station 110.

The base station 110 receives the PRACH preamble signal transmitted from the mobile stations 221 and 222, and identifies the sequence so that the base station 110 may determine that the mobile stations 221 and 222 are NOMA-enabled mobile stations. As a result, the base station 110 may perform NOMA pairing, with the mobile station 221, 222 being the above mobile station 121 having a larger path loss, for example.

In this manner, the base station 110 broadcasts NOMA-enabled preamble information indicating a specific preamble signal to be transmitted to the base station 110 from the NOMA-enabled mobile stations 221 and 222, among preamble signals in the random access procedure upon the connection to a NOMA-enabled cell. Based on the NOMA-enabled preamble information broadcast from the base station 110, the NOMA-enabled mobile stations 221 and 222 transmit to the base station 110, a specific preamble signal in the random access procedure for connection to the NOMA-enabled base station cells 211 and 212. The base station 110 performs selection (pairing) of mobile stations for NOMA wireless transmission, based on whether the preamble signal transmitted in the random access procedure upon connection to a NOMA-enabled cell is a specific preamble signal.

As depicted in FIGS. 7 and 8, the base station 110 may broadcast NOMA-enabled preamble information indicating specific preamble signals (# n+1 to # m, # m to #63) grouped depending on the wireless quality between the base station 110 and the mobile stations. In this case, the NOMA-enabled mobile stations 221 and 222 transmit to the base station 110, a preamble signal of a group in accordance with the wireless quality between the mobile stations 221 and 222 and the base station 110 among the specific preamble signals in the random access procedure.

The base station 110 performs selection (pairing) of mobile stations for NOMA wireless transmission, based on whether the preamble signal transmitted in the random access procedure upon connection to a NOMA-enabled cell is a specific preamble signal. The base station 110 determines the wireless quality between the mobile station transmitting the preamble signal and the base station 110, depending on to which group the specific preamble signal transmitted in the random access procedure upon the connection to a NOMA-enabled cell belongs. For example, the base station 110 may use the result of this determination of the wireless quality for selection (pairing) of mobile stations performing NOMA wireless transmission or may use it for other processing.

Figure 9:
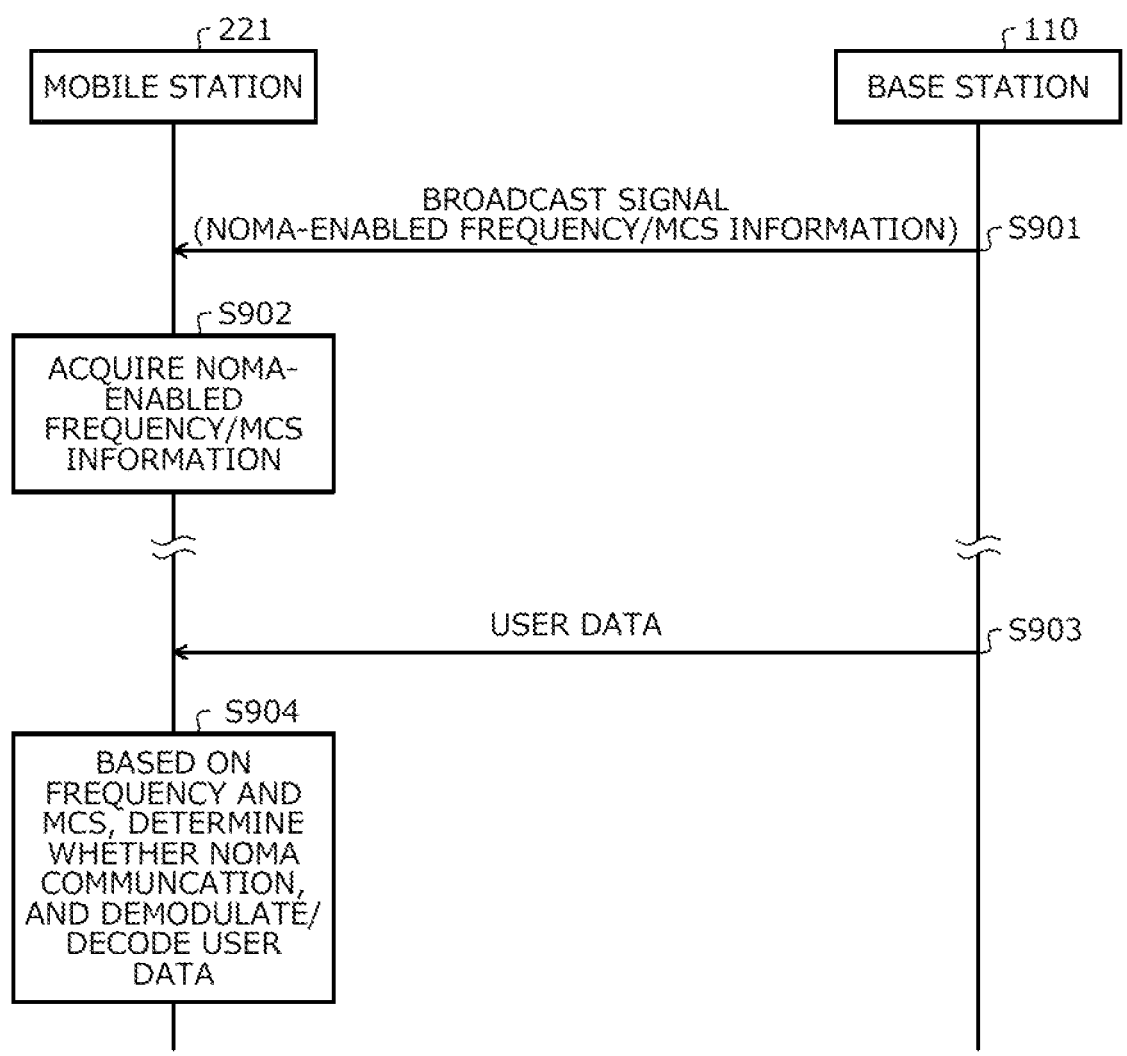
FIG. 9 is a sequence diagram depicting an example of user data demodulation and decoding processing in the communication system according to the embodiment.

FIG. 9 is a sequence diagram depicting an example of user data demodulation and decoding processing in the communication system according to the embodiment. In the communication system 100 of the embodiment, steps depicted in FIG. 9 for example are executed as the user data demodulation and decoding processing. Although in FIG. 9, processing by the NOMA-enabled mobile station 221 is described, the same applies to processing of another NOMA-enabled mobile station (e.g., mobile station 222).

First, the base station 110 wirelessly transmits a broadcast signal including NOMA-enabled frequency/MCS information (step S901). The NOMA-enabled frequency/MCS information is information indicating a predetermined frequency domain and a modulation and coding scheme (MCS) for use in NOMA DL wireless transmission. MCS is an index indicating a communication method such as modulation scheme and coding scheme. Next, the mobile station 221 acquires the NOMA-enabled frequency/MCS information from the broadcast signal wirelessly transmitted from the base station 110 at step S901 (step S902).

Next, the base station 110 wirelessly transmits user data destined for the mobile station 221 (step S903). In the case of transmitting the user data by NOMA at step S903, the base station 110 transmits the user data by using the frequency domain and MCS indicated by the NOMA-enabled frequency/MCS information described above. In the case of transmitting the user data not by NOMA (e.g., by OFDMA), the base station 110 transmits the user data by using a frequency domain and MCS different from the frequency domain and MCS indicated by the NOMA-enabled frequency/MCS information described above.

The frequency domain and MCS for use in the transmission of the user data at step S903 are transmitted from the base station 110 to the mobile station 221 by DL control information for example. The DL control information may be, for example, physical downlink control channel (PD-CCH).

Next, the mobile station 221 determines the frequency domain and MCS of the user data wirelessly transmitted from the base station 110 at step S903. The determination may be made based on, for example, the DL control information transmitted from the base station 110 to the mobile station 221. The mobile station 221 determines whether this user data has been transmitted by NOMA, based on the NOMA-enabled frequency/MCS information acquired at step S902 and on the determined frequency domain and MCS. The mobile station 221 then demodulates and decodes the user data wirelessly transmitted from the base station 110 at step S903, based on the determination result (step S904).

At step S904, for example, when the determined frequency domain and MCS are included in the frequency domain and MCS indicated by the NOMA-enabled frequency/MCS information, the mobile station 221 determines that the user data has been transmitted by NOMA. In this case, the mobile station 221 performs demodulation and decoding of the user data by a NOMA-enabled scheme. For example, the mobile station 221 decodes a replica signal of the signal destined for the mobile station 122 having a larger path loss paired with the mobile station 221. Then, based on the decoded replica signal, the mobile station 221 removes the signal destined for the mobile station 122 from the reception signal from the base station 110, and decodes remaining signal components as a signal destined for the mobile station 221.

When the determined frequency domain and MCS are not included in the frequency domain and MCS indicated by the NOMA-enabled frequency/MCS information, the mobile station 221 determines that the user data has been transmitted by OFDMA for example. In this case, the mobile station 221 demodulates and decodes the user data by an OFDMA-enabled scheme.

Figure 10:
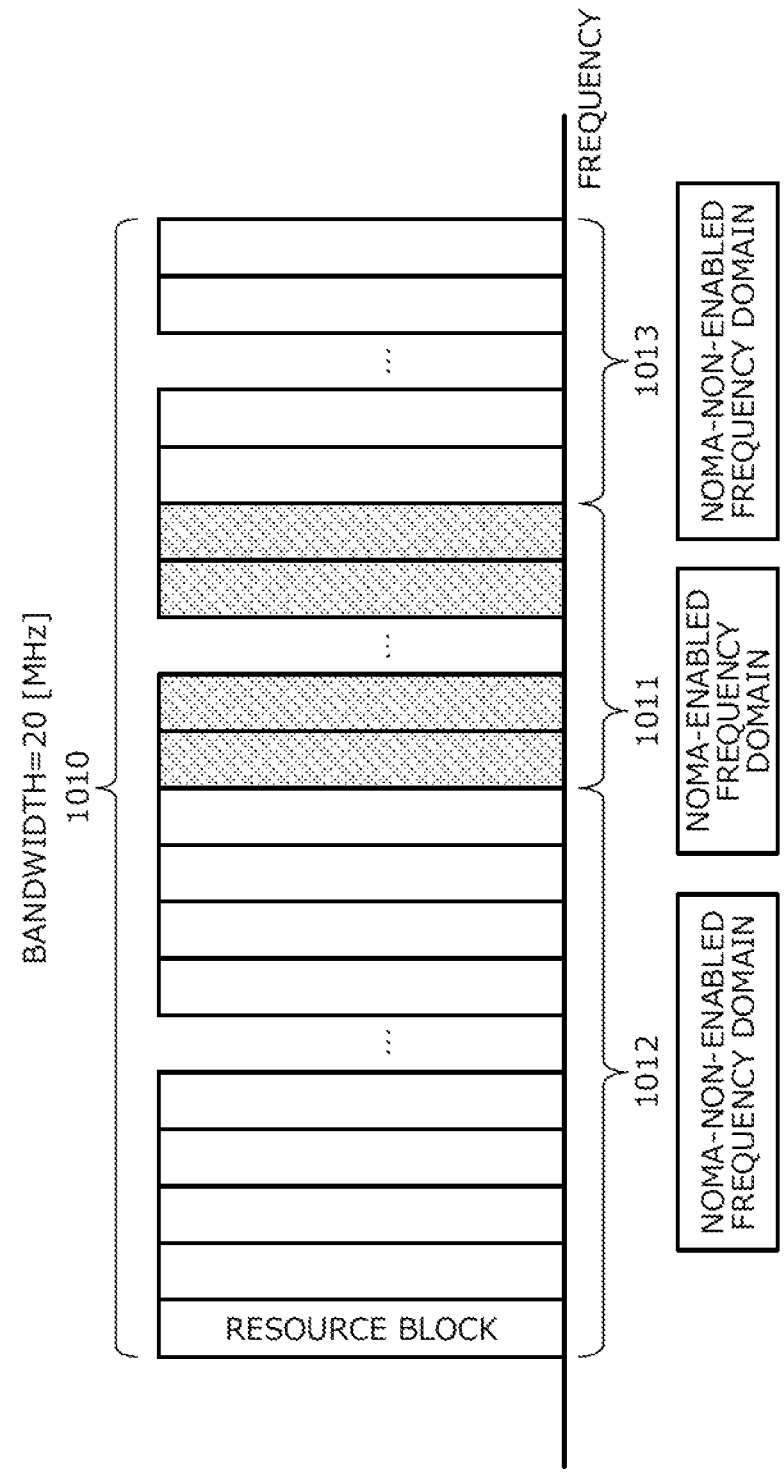
FIG. 10 is a diagram depicting an example of frequency domains for NOMA-enabled use and NOMA-non-enabled use according to the embodiment.

FIG. 10 is a diagram depicting an example of frequency domains for NOMA-enabled use and NOMA-non-enabled use according to the embodiment. In FIG. 10, the horizontal axis represents frequency. A system band 1010 is a frequency domain usable by the base station 110 in a NOMA-enabled base station cell. The bandwidth of the system band 1010 is 20 [MHz], for example.

The system band 1010 is divided into resource blocks. The resource blocks are constant irrespective of the bandwidth of the system band 1010. The number of the resource blocks usable within a cell depends on the bandwidth of the system band 1010. For example, 100 resource blocks may be used in the system band 1010 with the bandwidth of 20 [MHz]. The resource blocks may be identified by resource block numbers.

In the example depicted in FIG. 10, a frequency domain 1011 of the system band 1010 is configured as a NOMA-enabled frequency domain. Frequency domains 1012 and 1013 of the system band 1010 are configured as NOMA-non-enabled frequency domain.

In this case, by a broadcast signal, the base station 110 transmits, as the NOMA-enabled frequency/MCS information described above, information capable of specifying the NOMA-enabled frequency domain 1011 and the NOMA-non-enabled frequency domains 1012 and 1013. For example, the base station 110 transmits, as the NOMA-enabled frequency/MCS information, information indicating the NOMA-enabled frequency domain 1011 and the NOMA-non-enabled frequency domains 1012 and 1013. Such NOMA-enabled frequency/MCS information may be realized by, for example, bitmaps indicating for each resource block number whether NOMA is supported.

FIG. 11 is a diagram depicting an example of NOMA-enabled MCS and NOMA-non-enabled MCS according to the embodiment. An MCS table 1100 of FIG. 11 depicts MCS usable by the base station 110 when transmitting DL user data. The MCS table 1100 includes MCS indexes 0 to 31.

The MCS indexes in the MCS table 1100 are each correlated with a modulation order and transport block size (TBS) index. The modulation order is information designating a modulation scheme. The TBS index is information designating the size of a transport block. In scheduling, the base station 110 selects which MCS is to be used for communication between the base station 110 and a mobile station.

In the example depicted in FIG. 11, the MCS indexes 0 to 10 and 21 to 31 of the MCS table 1100 are configured for NOMA-non-enabled MCS. Note that in the example depicted in FIG. 11, the MCS indexes 29 to 31 of the MCS table 1100 are reserved and are not used. The MCS indexes 11 to 20 of the MCS table 1100 are configured for NOMA-enabled MCS.

In this case, by broadcast signals, the base station 110 transmits, as the NOMA-enabled frequency/MCS information described above, information capable of specifying the NOMA-non-enabled MCS indexes (0 to 10 and 21 to 31) and the NOMA-enabled MCS indexes (11 to 20). For example, the base station 110 transmits, as the NOMA-enabled frequency/MCS information, a range of the NOMA-enabled MCS indexes and ranges of the NOMA-non-enabled MCS indexes. Such NOMA-enabled frequency/MCS information may be realized by, e.g. bitmaps indicating whether NOMA is supported for each MCS index.

Figure 12:
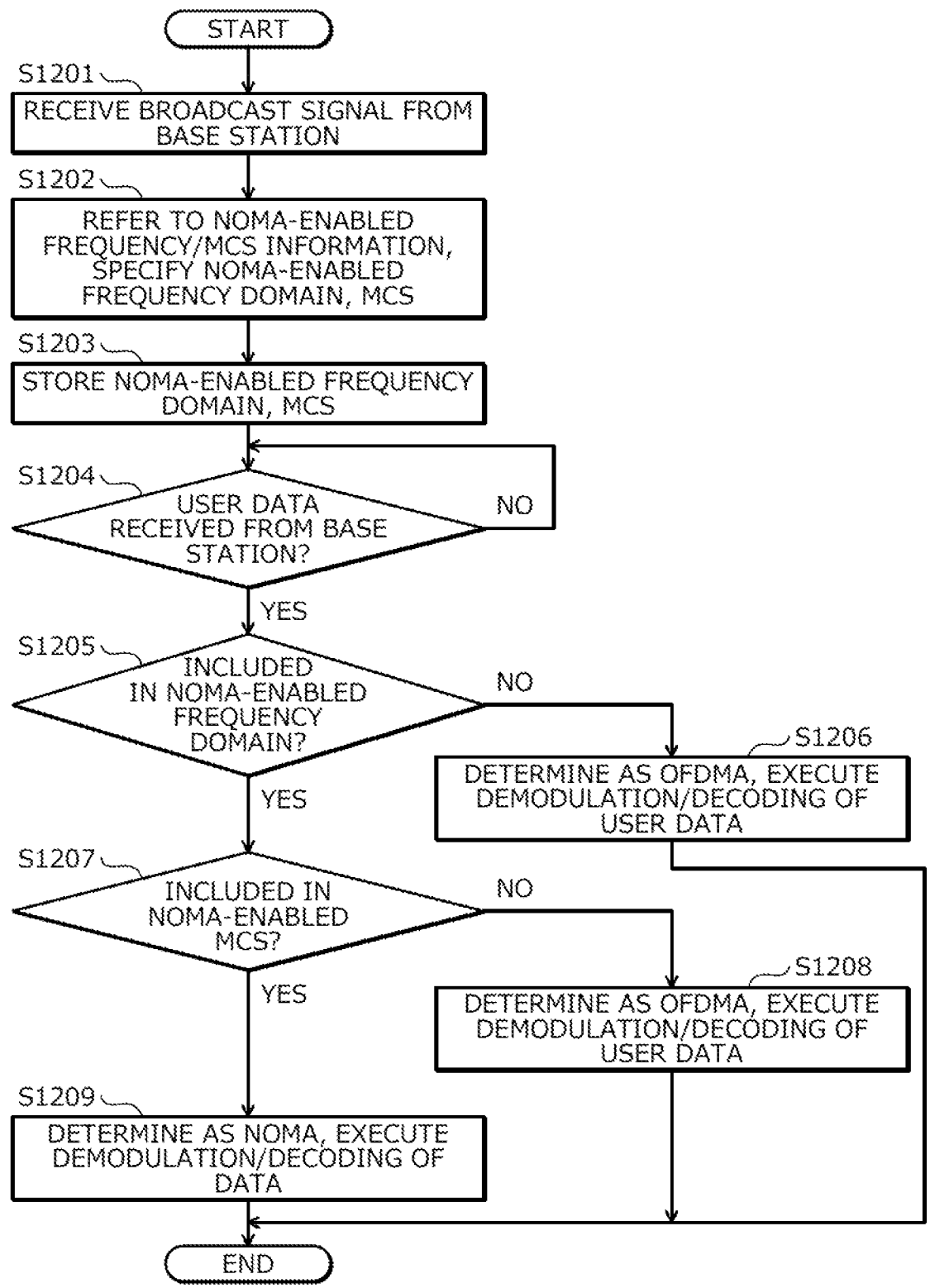
FIG. 12 is a flowchart depicting an example of user data demodulation/decoding processing by a mobile station according to the embodiment.

FIG. 12 is a flowchart depicting an example of user data demodulation/decoding processing by the mobile station according to the embodiment. Although processing of the NOMA-enabled mobile station 221 is described in FIG. 12, the same applies to processing of other NOMA-enabled mobile stations (e.g., mobile station 222). The mobile station 221 according to the embodiment connects to a base station cell of the base station 110 by the random access procedure based on preamble signals transmitted in the processing depicted in FIG. 8, for example, and thereafter, executes operations depicted in FIG. 12.

First, the mobile station 221 receives a broadcast signal transmitted from the base station 110 in the connected base station cell (step S1201). Next, the mobile station 221 refers to the NOMA-enabled frequency/MCS information included in the broadcast signal received at step S1201, and specifies a NOMA-enabled frequency domain/MCS (step S1202). Next, the mobile station 221 stores to a memory of the mobile station 221, the NOMA-enabled frequency domain and MCS specified at step S1202 (step S1203).

Next, in the connected base station cell, the mobile station 221 determines whether user data has been received from the base station 110 (step S1204), and waits until the user data is received from the base station 110 (step S1204: NO). When receiving the user data from the base station 110 (step S1204: YES), the mobile station 221 proceeds to step S1205. That is, the mobile station 221 determines whether the frequency band used for the received user data is included in the NOMA-enabled frequency domain stored at step S1203 (step S1205).

When the frequency band is not included in the NOMA-enabled frequency domain at step S1205 (step S1205: NO), the mobile station 221 determines that the user data received at step S1204 has been transmitted, not by NOMA, by OFDMA. In this case, using the OFDMA scheme, the mobile station 221 executes demodulation and decoding of the user data received at step S1204 (step S1206), ending a series of operations.

When the frequency band is included in the NOMA-enabled frequency domain at step S1205 (step S1205: YES), the mobile station 221 proceeds to step 1207. That is, the mobile station 221 determines whether the MCS used for the received user data is included in the NOMA-enabled MCS stored at step S1203 (step S1207).

When the MCS is not included in the NOMA-enabled MCS at step S1207 (step S1207: NO), the mobile station 221 determines that the user data received at step S1204 has been transmitted, not by NOMA, by OFDMA. In this case, using the OFDMA scheme, the mobile station 221 executes demodulation and decoding of the user data received at step S1204 (step S1208), ending a series of operations.

When the MCS is included in the NOMA-enabled MCS at step S1207 (step S1207: YES), the mobile station 221 determines that the user data received at step S1204 has been transmitted by NOMA. In this case, using the NOMA scheme, the mobile station 221 executes demodulation and decoding of the user data received at step S1204 (step S1209), ending a series of operations.

As described in FIGS. 9 to 12, the broadcast signal transmitted from the base station 110 includes NOMA-enabled frequency/MCS information indicating a frequency domain allowing application of NOMA communication and an MCS range allowing application to the NOMA communication. On the contrary, the NOMA-enabled mobile stations 221 and 222 acquire the NOMA-enabled frequency/MCS information included in the broadcast signal transmitted from the base station 110. The mobile stations 221 and 222 then determine whether the wireless data signal from the base station 110 has been transmitted by NOMA, from the frequency band in which the wireless data signal is transmitted and from the MCS applied to the wireless data signal.

This enables the mobile stations 221 and 222 to determine whether NOMA is applied to the wireless data signal transmitted from the base station 110, without directly notifying the mobile stations 221 and 222, by DL control information, of whether NOMA is applied. Configuration may be such that the mobile stations 221 and 222 are directly notified by the DL control information of whether NOMA is applied to the wireless data signal transmitted from the base station 110.

In this manner, the base station 110 broadcasts, by the wireless signal, NOMA-enabled frequency/MCS information indicating a specific transmission method for NOMA wireless transmission in the NOMA-enabled base station cells 211 and 212. The base station 110 then uses the specific transmission method indicated by the NOMA-enabled frequency/MCS information, for the NOMA wireless transmission in the NOMA-enabled base station cells 211 and 212. This enables the mobile station 221 that is a destination of NOMA wireless transmission to determine that NOMA is applied based on the transmission method of data received from the base station 110, to thereby decode the data by a decoding scheme corresponding to the NOMA wireless transmission.

Although in the example depicted in FIGS. 9 to 12 the configuration has been described where the frequency domain and the MCS range are classified into NOMA-enabled application and NOMA-non-enabled application, configuration may be such that only either the frequency domain or the MCS range is be classified into the NOMA-enabled application and the NOMA-non-enabled application. In this case, the base station 110 may broadcast, instead of the NOMA-enabled frequency/MCS information, information indicating a specific frequency domain or a specific MCS for NOMA wireless transmission in the NOMA-enabled base station cells 211 and 212.

For example, the base station 110 uses the specific frequency domain indicated by the broadcasted information, for NOMA wireless transmission in the NOMA-enabled base station cells 211 and 212. This enables the mobile station 221 that is a destination of NOMA wireless transmission to determine that NOMA is applied based on the frequency band of data received from the base station 110, to thereby decode the data by a decoding scheme corresponding to the NOMA wireless transmission.

As an alternative, the base station 110 uses the specific MCS indicated by the broadcasted information, for NOMA wireless transmission in the NOMA-enabled base station cells 211 and 212. This enables the mobile station 221 that is a destination of NOMA wireless transmission to determine that NOMA is applied based on MCS of data received from the base station 110, to thereby decode the data by a decoding scheme corresponding to the NOMA wireless transmission.

Figure 13:
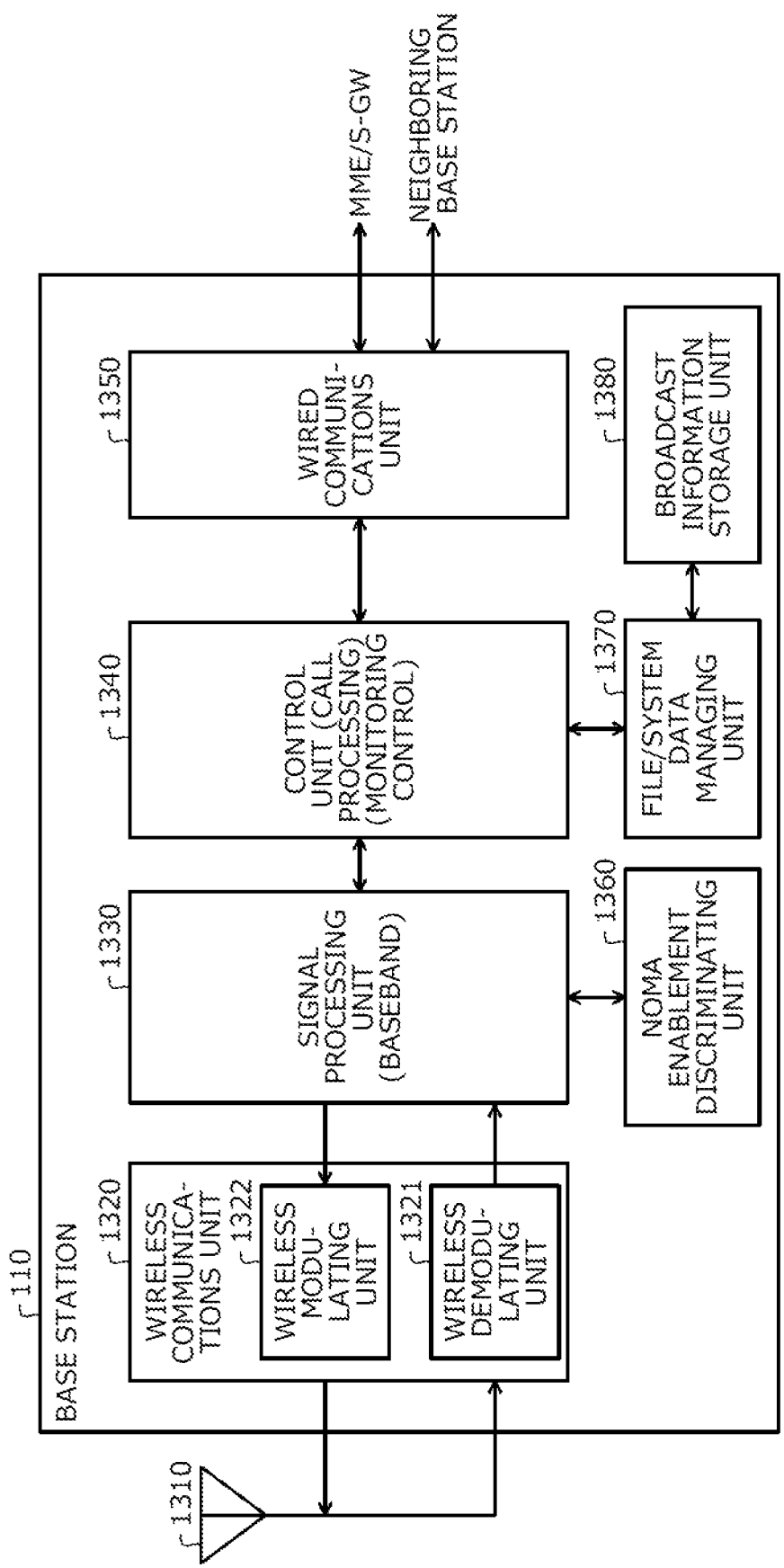
FIG. 13 is a diagram depicting an example of a base station according to the embodiment.

FIG. 13 is a diagram depicting an example of the base station according to the embodiment. As depicted in FIG. 13, the base station 110 according to the embodiment includes, for example, an antenna 1310, a wireless communications unit 1320, a signal processing unit 1330, a control unit 1340, and a wired communications unit 1350. The base station 110 includes a NOMA enablement discriminating unit 1360, a file/system data managing unit 1370, and a broadcast information storage unit 1380.

The antenna 1310 receives a signal wirelessly transmitted from a mobile station (e.g., mobile station 121, 122) and outputs the received signal to the wireless communications unit 1320. The antenna 1310 wirelessly transmits a signal output from the wireless communications unit 1320 to the mobile station (e.g., mobile station 121, 122).

The wireless communications unit 1320 performs wireless communication using the antenna 1310. For example, the wireless communications unit 1320 includes a wireless demodulating unit 1321 and a wireless modulating unit 1322. The wireless demodulating unit 1321 demodulates a signal output from the antenna 1310 and outputs the demodulated signal to the signal processing unit 1330. The wireless modulating unit 1322 performs modulation based on the signal output from the signal processing unit 1330 and outputs a signal obtained as a result of modulation to the antenna 1310.

The wireless communications unit 1320 may include, for example, an amplifier that amplifies a signal output from the antenna 1310, a frequency converter that frequency-converts the amplified signal to a baseband, and a digital converter that converts the frequency-converted signal to a digital signal. In this case, the wireless demodulating unit 1321 demodulates a signal converted to a digital signal by the digital converter.

The wireless communications unit 1320 may include, for example, an analog converter that converts a signal obtained by modulation of the wireless modulating unit 1322 to an analog signal, a frequency converter that frequency-converts the signal converted to the analog signal to a high-frequency band, and an amplifier that amplifies the frequency-converted signal. In this case, the signal amplified by the amplifier is output to the antenna 1310.

The signal processing unit 1330 performs baseband processing of signals transmitted from/received by the wireless communications unit 1320. The baseband processing by the signal processing unit 1330 includes, for example, decoding processing of a signal output from the wireless communications unit 1320 and processing of encoding data transmitted from the base station 110 and of outputting to the wireless communications unit 1320, a signal obtained by encoding.

The control unit 1340 provides communication control in the base station 110. The communication control of the control unit 1340 includes, for example, call processing between the base station 110 and the mobile station (e.g., base station 121, 122) and monitoring control of communication status in the base station 110. The communication control of the control unit 1340 includes the NOMA pairing described above.

The wired communications unit 1350 performs wired communication with another communication device connected by cable to the base station 110. Another communication device connected by cable to the base station 110 includes, for example, a mobility management entity (MME) and a serving-gateway (S-GW) in a core network to which the base station 110 is connected. Another communication device connected to the base station 110 by cable includes a neighboring base station, etc. connected via an X2 interface to the base station 110.

The NOMA enablement discriminating unit 1360 is a processing unit that performs processing (see FIGS. 4 to 8) for discriminating whether the mobile stations 221 to 223 are NOMA-enabled, based on preamble signals transmitted from the mobile stations 221 to 223 for connection to base station cells of the base station 110. For example, the NOMA enablement discriminating unit 1360 performs processing for discriminating whether the mobile stations 221 to 223 are NOMA-enabled, based on preamble signals from the mobile stations 221 to 223 subjected to reception processing by the signal processing unit 1330. The result of discrimination made by the NOMA enablement discriminating unit 1360 is output through the signal processing unit 1330, for example, to the control unit 1340, for use in NOMA pairing in the control unit 1340.

The file/system data managing unit 1370 is a processing unit that manages files and system data with which the base station 110 performs wireless communication. The broadcast information storage unit 1380 stores broadcast information that the base station 110 wirelessly transmits in the cell thereof. The broadcast information stored in the broadcast information storage unit 1380 includes, for example, the above NOMA-enabled cell information, NOMA possible quality information, NOMA-enabled preamble information, NOMA-enabled frequency/MCS information, etc.

The broadcast information stored in the broadcast information storage unit 1380 is output via the file/system data managing unit 1370 to the control unit 1340. The broadcast information output to the control unit 1340 is stored in a broadcast signal that is wirelessly transmitted in a cell of the base station 110 by the signal processing unit 1330, the wireless communications unit 1320, and the antenna 1310, under control of the control unit 1340.

In the base station 110 depicted in FIG. 13, the control unit generating the broadcast signal may be realized, for example, by the control unit 1340, the file/system data managing unit 1370, and the broadcast information storage unit 1380. The wireless communications unit transmitting the broadcast signal may be realized, for example, by the antenna 1310, the wireless communications unit 1320, and the signal processing unit 1330.

Figure 14:
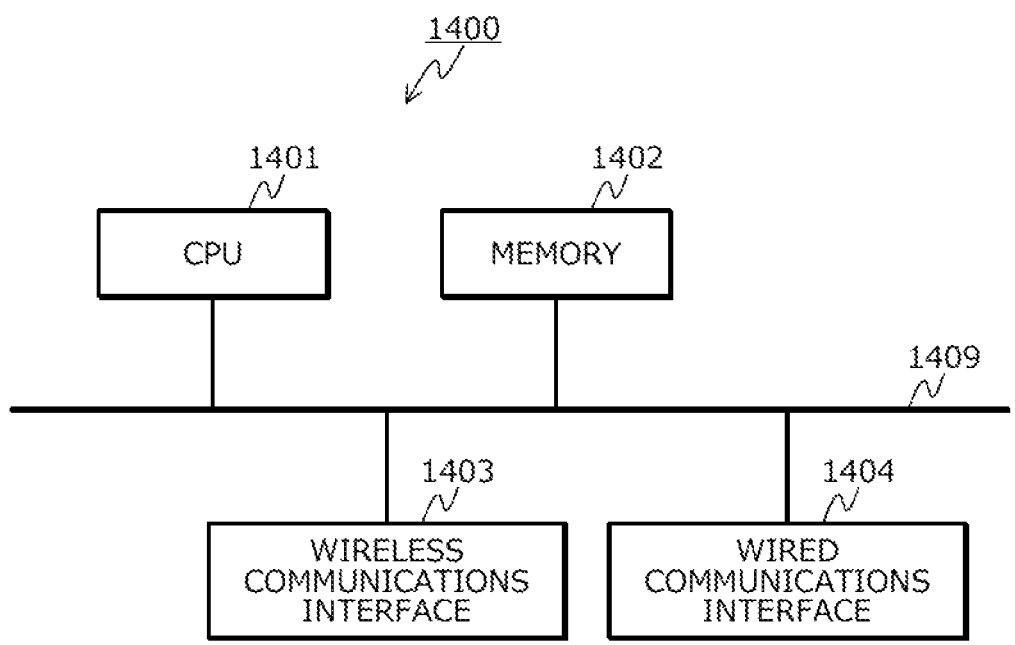
FIG. 14 is a diagram depicting an example of a hardware configuration of the base station according to the embodiment.

FIG. 14 is a diagram depicting an example of the hardware configuration of the base station according to the embodiment. The base station 110 depicted in FIG. 13 may be realized by a communication device 1400 depicted in FIG. 14, for example. The communication device 1400 includes a CPU 1401, a memory 1402, a wireless communications interface 1403, and a wired communications interface 1404. The CPU 1401, the memory 1402, the wireless communications interface 1403, and the wired communications interface 1404 are connected by a bus 1409.

The central processing unit (CPU) 1401 provides overall control of the communication device 1400. The memory 1402 includes, for example, a main memory and an auxiliary memory. The main memory is a random access memory (RAM), for example. The main memory is used as a work area for the CPU 1401. The auxiliary memory is a non-volatile memory such as a magnetic disk, an optical disk, and a flash memory. Various programs operating the communication device 1400 are stored in the auxiliary memory. The programs stored in the auxiliary memory are loaded into the main memory to be executed by the CPU 1401.

The wireless communications interface 1403 is a communications interface that performs wireless communication with externals (e.g., mobile stations 121 and 122) to the communication device 1400. The wireless communications interface 1403 is controlled by the CPU 1401. The wireless communications interface 1403 includes, for example, an analog/digital converter (ADC) and a digital/analog converter (DAC). The wireless communications interface 1403 includes an amplifier and a mixer performing frequency conversion.

The wired communications interface 1404 is a communications interface that performs wired communication with externals to the communication device 1400. The wired communications interface 1404 is controlled by the CPU 1401. Communication destinations of (external devices) the wired communications interface 1404 are, for example, communication devices of a core network to which the base station 110 is connected.

The antenna 1310 and the wireless communications unit 1320 depicted in FIG. 13 are included in the wireless communications interface 1403, for example. The wired communications unit 1350 depicted in FIG. 13 is included in the wired communications interface 1404. The signal processing unit 1330, the control unit 1340, the NOMA enablement discriminating unit 1360, and the file/system data managing unit 1370 depicted in FIG. 13 may be realized by the CPU 1401, for example. The broadcast information storage unit 1380 depicted in FIG. 13 may be realized by the memory 1402, for example.

Figure 15:
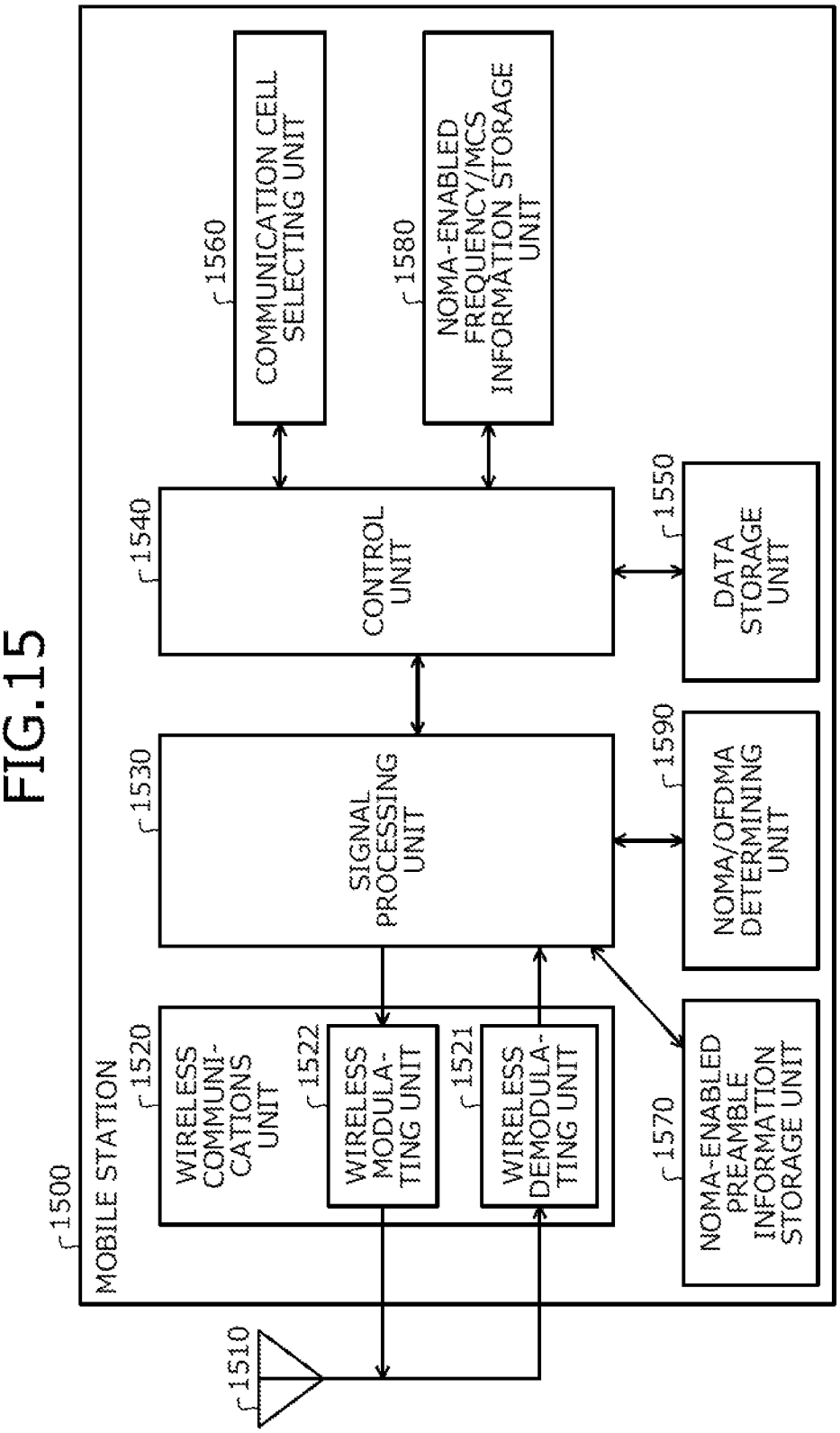
FIG. 15 is a diagram depicting an example of the mobile station according to the embodiment.

FIG. 15 is a diagram depicting an example of the mobile station according to the embodiment. The NOMA-enabled mobile stations 221 and 222 described above may be realized by a mobile station 1500 depicted in FIG. 15, for example. The mobile station 1500 includes, for example, an antenna 1510, a wireless communications unit 1520, a signal processing unit 1530, a control unit 1540, a data storage unit 1550, and a communication cell selecting unit 1560. The mobile station 1500 includes a NOMA-enabled preamble information storage unit 1570, a NOMA-enabled frequency/MCS information storage unit 1580, and a NOMA/OFDMA determining unit 1590.

The antenna 1510 receives a signal wirelessly transmitted from the base station 110 and outputs the received signal to the wireless communications unit 1520. The antenna 1510 wirelessly transmits the signal output from the wireless communications unit 1520 to the base station 110.

The wireless communications unit 1520 performs wireless communication using the antenna 1510. For example, the wireless communications unit 1520 includes a wireless demodulating unit 1521 and a wireless modulating unit 1522. The wireless demodulating unit 1521 demodulates a signal output from the antenna 1510 and outputs the demodulated signal to the signal processing unit 1530. The wireless modulating unit 1522 performs modulation based on the signal output from the signal processing unit 1530 and outputs the signal obtained by the modulation to the antenna 1510.

The wireless communications unit 1520 may include, for example, an amplifier that amplifies the signal output from the antenna 1510, a frequency converter that frequency-converts the amplified signal to a baseband, and a digital converter that converts the frequency-converted signal to a digital signal. In this case, the wireless demodulating unit 1521 demodulates a signal converted to a digital signal by the digital converter.

The wireless communications unit 1520 may include, for example, an analog converter that converts the signal obtained by the demodulation of the wireless demodulating unit 1522 to an analog signal, a frequency converter that frequency-converts the signal converted to the analog signal to a high-frequency band, and an amplifier that amplifies the frequency-converted signal. In this case, the signal amplified by the amplifier is output to the antenna 1510.

The signal processing unit 1530 performs baseband processing of a signal transmitted from/received by the wireless communications unit 1520. The baseband processing by the signal processing unit 1530 includes, for example, decoding processing of a signal output from the wireless communications unit 1520 and processing of encoding data transmitted from the mobile station 1500 and outputting a signal obtained by the encoding to the wireless communications unit 1520. The decoding processing by the signal processing unit 1530 includes, for example, decoding processing including SIR, etc. corresponding to NOMA described above and decoding processing supporting OFDMA.

The control unit 1540 performs communication control in the mobile station 1500. The communication control of the control unit 1540 includes, for example, monitoring control of communication status, etc. in the mobile station 1500. The data storage unit 1550 stores various types of data for use in communication control of the control unit 1540.

The communication cell selecting unit 1560 performs processing for selecting a communication cell to which the mobile station 1500 is to connect. For example, the communication cell selecting unit 1560 acquires, via the antenna 1510, the wireless communications unit 1520, the signal processing unit 1530, and the control unit 1540, broadcast signals transmitted in base station cells of the base station 110. The communication cell selecting unit 1560 then performs processing (see, for example, FIG. 3) for preferentially selecting a NOMA-enabled base station cell as a communication cell, based on NOMA-enabled cell information included in the acquired broadcast signals.

When the mobile station 1500 does not satisfy a predetermined quality indicated by NOMA possible quality information included in the acquired broadcast signals, the communication cell selecting unit 1560 performs processing (see, for example, FIG. 3) for selecting a NOMA-non-enabled base station cell as a communication cell. The result of selection of a communication cell by the communication cell selecting unit 1560 is notified to the control unit 1540. Based on the selection result notified from the communication cell selecting unit 1560, the control unit 1540 controls connection to the base station cell selected by the communication cell selecting unit 1560.

The NOMA-enabled preamble information storage unit 1570 stores the NOMA-enabled preamble information described above. For example, the signal processing unit 1530 acquires NOMA-enabled preamble information from broadcast signals transmitted in the base station cells from the base station 110, and stores the acquired NOMA-enabled preamble information into the NOMA-enabled preamble information storage unit 1570.

In a random access procedure for connection to a NOMA-enabled base station cell under control from the control unit 1540, the signal processing unit 1530 uses the NOMA-enabled preamble information stored in the NOMA-enabled preamble information storage unit 1570. That is, the signal processing unit 1530 selects any one of sequences indicated by the NOMA-enabled preamble information, and generates a preamble signal of the selected sequence.

Using PRACH, the signal processing unit 1530 then transmits the generated preamble signal, as a random access request (Msg1) in the random access procedure, via the wireless communications unit 1520 and the antenna 1510, to the base station 110. As a result, the base station 110 may be notified indirectly that the mobile station 1500 is NOMA-enabled.

The NOMA-enabled frequency/MCS information storage unit 1580 stores the NOMA-enabled frequency/MCS information described above. For example, the signal processing unit 1530 acquires NOMA-enabled frequency/MCS information from broadcast signals transmitted in the base station cells from the base station. The signal processing unit 1530 then causes the NOMA-enabled frequency/MCS information storage unit 1580 to store the acquired NOMA-enabled frequency/MCS information via the control unit 1540.

Based on the NOMA-enabled frequency/MCS information stored in the NOMA-enabled frequency/MCS information storage unit 1580, the NOMA/OFDMA determining unit 1590 determines whether DL data from the base station 110 is wirelessly transmitted by NOMA or by OFDMA. That is, the NOMA/OFDMA determining unit 1590 determines whether the frequency band and MCS of DL data from the base station 110 is NOMA-enabled frequency band and MCS, based on the NOMA-enabled frequency/MCS information.

When the frequency band and MCS are determined to be NOMA-enabled frequency band and MCS, the NOMA/OFDMA determining unit 1590 determines that the DL data has been wirelessly transmitted by NOMA. When the frequency band and MCS is determined not to be NOMA-enabled frequency band and MCS, the NOMA/OFDMA determining unit 1590 determines that the DL data has been wirelessly transmitted by OFDMA. The result of determination by the NOMA/OFDMA determining unit 1590 is notified to the signal processing unit 1530.

When decoding DL data from the base station 110, the signal processing unit 1530 performs NOMA-enabled decoding processing including SIR, etc. when the NOMA/OFDMA determining unit 1590 determines that the DL data has been wirelessly transmitted by NOMA. When decoding DL data from the base station 110, the signal processing unit 1530 performs OFDMA-enabled decoding processing when the NOMA/OFDMA determining unit 1590 determines that the DL data has been wirelessly transmitted by OFDMA.

In the mobile station 1500 depicted in FIG. 15, a receiving unit receiving information broadcasted from the base station 110 may be realized, for example, by the antenna 1510, the wireless communications unit 1520, and the signal processing unit 1530. A wireless communications unit capable of supporting NOMA wireless transmission of the base station 110 may be realized, for example, by the antenna 1510, the wireless communications unit 1520, the signal processing unit 1530, the control unit 1540, and the communication cell selecting unit 1560.

Figure 16:
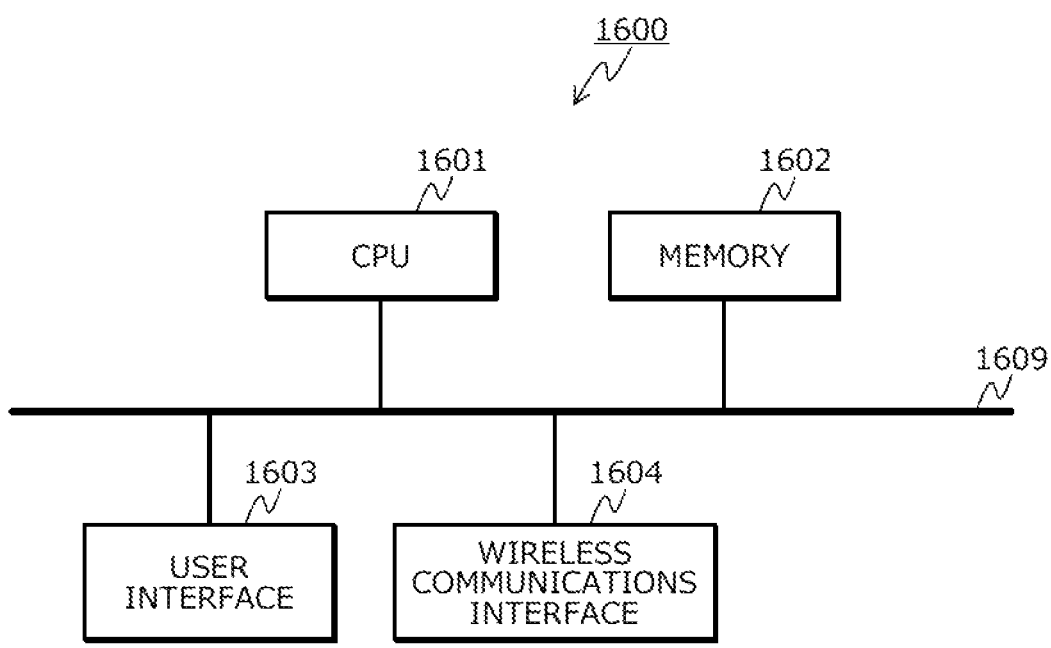
FIG. 16 is a diagram depicting an example of a hardware configuration of the mobile station according to the embodiment.

FIG. 16 is a diagram depicting an example of the hardware configuration of the mobile station according to the embodiment. The mobile station 1500 depicted in FIG. 15 may be realized for example by a communication device 1600 depicted in FIG. 16. The communication device 1600 includes a CPU 1601, a memory 1602, a user interface 1603, and a wireless communications interface 1604. The CPU 1601, the memory 1602, the user interface 1603, and the wireless communications interface 1604 are connected by a bus 1609.

The CPU 1601 provides overall control of the communication device 1600. The memory 1602 includes, for example, a main memory and an auxiliary memory. The main memory is a RAM for example. The main memory is used as a work area for the CPU 1601. The auxiliary memory is, for example, a non-volatile memory such as a magnetic disk and a flash memory. The auxiliary memory stores various programs that operate the communication device 1600. The programs stored in the auxiliary memory are loaded onto the main memory and are executed by the CPU 1601.

The user interface 1603 includes, for example, an input device that receives operation input from the user and an output device that outputs information to the user. The input device may be realized for example by keys (e.g., a keyboard) or a remote controller. The output device may be realized for example by a display and a speaker. The input device and the output device may be realized by a touch panel, etc. The user interface 1603 is controlled by the CPU 1601.

The wireless communications interface 1604 is a communications interface that performs wireless communication with external devices (e.g., base station 110) to the communication device 1600. The wireless communications interface 1604 is controlled by the CPU 1601.

The antenna 1510 and the wireless communications unit 1520 depicted in FIG. 15 are included in the wireless communications interface 1604, for example. The signal processing unit 1530, the control unit 1540, the communication cell selecting unit 1560, and the NOMA/OFDMA determining unit 1590 depicted in FIG. 15 may be realized by the CPU 1601 for example. The data storage unit 1550, the NOMA-enabled preamble information storage unit 1570, and the NOMA-enabled frequency/MCS information storage unit 1580 depicted in FIG. 15 may be realized by the memory 1602 for example.

In this manner, in the communication system 100 according to the embodiment, the base station 110 broadcasts, in the NOMA-enabled base station cells 211 and 212, NOMA-enabled cell information indicating that the cells are NOMA-enabled.

This enables the NOMA-enabled mobile stations 221 and 222 to connect to the NOMA-enabled base station cells 211 and 212 more preferentially than the NOMA-non-enabled base station cells 213 and 214. It is thus possible to connect more NOMA-enabled mobile stations 221, 222 to the NOMA-enabled base station cells 211, 212 and thereby, increase the number of combinations of mobile stations allowing NOMA pairing in the base station 110. This leads to an increase of the NOMA wireless transmission and improvement of utilization efficiency of wireless resources and throughput in the communication system 100.

The base station 110 broadcasts NOMA possible quality information indicating conditions relating to wireless quality (e.g., path loss or SIR) between the base station 110 and the mobile stations for performing NOMA wireless transmission in the NOMA-enabled base station cells 211 and 212.

This enables the NOMA-enabled mobile stations 221 and 222 to not connect to the NOMA-enabled base station cells 211 and 212 when the wireless quality with the base station 110 is too low. It is thus possible to connect more NOMA-enabled mobile stations that do not have wireless quality that is too low (e.g., the path loss that is equal to or less than the threshold value Th #2) to the NOMA-enabled base station cells 211 and 212, to thereby improve the NOMA communication quality. This leads to an improvement of throughput in the NOMA-enabled base station cells 211 and 212.

The base station 110 may broadcast the NOMA-enabled cell information and the NOMA possible quality information together as one piece of information. For example, the base station 110 stores the NOMA possible quality information into a NOMA-enabled cell broadcast signal and does not store the NOMA possible quality information into a NOMA-non-enabled cell broadcast signal. This enables the mobile stations 221 and 222 to discriminate NOMA-enabled/NOMA-non-enabled of cells by the presence or absence of the NOMA possible quality information, without the base station 110 storing the NOMA-enabled cell information into the broadcast signal.

Furthermore, the base station 110 may broadcast NOMA-enabled preamble information indicating a specific preamble signal to be transmitted to the base station 110 in the random access procedure by the NOMA-enabled mobile stations 221 and 222. This enables the NOMA-enabled mobile stations 221 and 222 to transmit the specific preamble signal to the base station 110 in the random access procedure.

Accordingly, the base station 110 is capable of discriminating whether the connected mobile stations 221 and 222 are NOMA-enabled, based on whether the preamble signal transmitted in the random access procedure is the specific preamble signal. As a result, while avoiding increases in the uplink (UL) signaling amount, the base station 110 is capable of discriminating whether the connected mobile stations 221 and 222 are NOMA-enabled and is capable of performing selection (pairing) of mobile stations for NOMA wireless transmission. By avoiding increases in the UL signaling amount, increases in the amount of wireless resources to be used may be prevented.

Furthermore, the base station 110 broadcasts NOMA-enabled frequency/MCS information indicating a specific transmission method (at least one of frequency band and MCS to be used) for NOMA wireless transmission in the NOMA-enabled base station cells 211 and 212. This transmission method includes at least one of the frequency band and MCS to be used. The base station 110 then uses the above specific transmission method for the NOMA wireless transmission in the NOMA-enabled base station cells 211 and 212.

Consequently, while avoiding increases in the DL signaling amount, the mobile stations 221 and 222 that are data transmission destinations in the NOMA-enabled base station cells 211 and 212 are capable of discriminating whether NOMA is applied, based on the transmission method used for the data transmission. This enables the mobile stations 221 and 222 to perform data decoding based on the discrimination result. Since increases in the DL signaling amount may be avoided, increases in the wireless resources to be used may be suppressed.

For example, an existing method for a mobile station to select a connection-destination base station cell is a method of selecting a base station cell (having best reception quality) transmitting a reference signal whose reception power at the mobile station is maximum. In this method, since the reception power is the main criteria for cell selection, the NOMA-enabled mobile stations may not select a NOMA-enabled base station cell under an environment in which the NOMA-enabled and NOMA-non-enabled base station cells are intermixed. In a case where a base station cell is NOMA-enabled and the base station cell accommodates more NOMA-enabled mobile stations than the NOMA-non-enabled mobile stations, the utilization efficiency of the wireless resources in the base station cell may be improved. To this end, it is desirable to enable the NOMA-enabled mobile station to select a NOMA-enabled base station cell instead of a NOMA-non-enabled base station cell when performing cell selection.

On the contrary, according to the above embodiment, the base station broadcasts, in a NOMA-enabled base station cell, NOMA-enabled cell information indicating that NOMA is enabled. This enables the NOMA-enabled mobile station to connect to a NOMA-enabled base station cell more preferentially than the NOMA-non-enabled base station cell. It is therefore possible to connect more NOMA-enabled mobile stations to a NOMA-enabled base station cell and to consequently increase the number of combinations of mobile stations allowing NOMA pairing. Hence, more NOMA wireless transmissions improve the utilization efficiency of the wireless resources to achieve improved throughput.

When performing NOMA transmission, pairing is carried out in which a mobile station having a small path loss and a mobile station having a large path loss are selected and paired. At this time, a mobile station that has a path loss that is too large is not suitable for the NOMA wireless transmission even if the mobile station is NOMA-enabled. This is because, for example, when a mobile station that has a path loss that is too large is selected as NOMA pair, the reception power at the mobile station having the path loss that is too large may become insufficient for demodulation and decoding of a reception signal. Increasing the power to the mobile station having the path loss that is too large results in too little power being assigned for transmission to the mobile station having a small path loss paired with the mobile station, whereby the gain that may be expected by NOMA may be lost. In this manner, when a NOMA-enabled mobile station with a path loss that is too large connects to a NOMA-enabled base station cell, sufficient communication quality cannot be obtained by NOMA and an improvement of throughput in the NOMA-enabled base station cell cannot be achieved.

On the contrary, according to the above embodiment, the base station broadcasts NOMA possible quality information indicating conditions relating to wireless quality between the base station and mobile stations for NOMA wireless transmission in a NOMA-enabled base station cell. This enables a NOMA-enabled mobile station to not connect to a NOMA-enabled base station cell when the wireless quality between the NOMA-enabled mobile station and the base station is too low. It is thus possible to connect more NOMA-enabled mobile stations not having wireless quality that is too low to a NOMA-enabled base station cell, to thereby improve the NOMA communication quality. Therefore, improvement of throughput in the NOMA-enabled base station cell may be facilitated.

After the NOMA-enabled mobile station selects a NOMA-enabled base station cell for connection, the base station needs to discriminate that the connected mobile station is NOMA-enabled. To this end, for example, it is also conceivable that the NOMA-enabled mobile station connected to the NOMA-enabled base station cell transmits to the base station, a UL control signal indicating that the mobile station is NOMA-enabled. However, this may result in an increase of the UL signaling amount.

On the contrary, according to the above embodiment, the base station broadcasts NOMA-enabled preamble information indicating a specific preamble signal to be transmitted to the base station in the random access procedure by the NOMA-enabled mobile station. This enables the NOMA-enabled mobile station to transmit the specific preamble signal indicated by the NOMA-enabled preamble information to the base station in the random access procedure. Accordingly, the base station is capable of discriminating whether the connected mobile station is NOMA-enabled, based on whether the preamble signal transmitted in the random access procedure is the specific preamble signal. As a result, without increases in the UL signaling amount, the base station is capable of discriminating whether the connected mobile station is NOMA-enabled and is capable of performing selection (pairing) of mobile stations for NOMA wireless transmission.

NOMA is not always applied to DL data transmission to a NOMA-enabled mobile station connected to a NOMA-enabled base station. This is due to, for example, occurrence of a situation in which there is no proper mobile station to be paired for NOMA transmission. Hence, the NOMA-enabled mobile station needs to determine, for a signal received from the base station in DL, whether to perform NOMA-enabled decoding processing or to perform decoding processing supporting a signal (e.g., OFDMA signal) that is not a NOMA signal. To this end, for example, while it is also conceivable that the base station performing data transmission to the NOMA-enabled mobile station transmits to the NOMA-enabled mobile station, DL control information notifying whether to apply NOMA, this may result in increases in the DL signaling amount.

On the contrary, according to the above embodiment, the base station broadcasts NOMA-enabled frequency/MCS information indicating a specific transmission method for NOMA wireless transmission in a NOMA-enabled base station cell. This transmission method includes at least one of the frequency band and MCS used. The base station then uses the above specific transmission method for the NOMA wireless transmission in the NOMA-enabled base station cell. Consequently, while avoiding increases in the DL signaling amount, the mobile station that is a data transmission destination in the NOMA-enabled base station cell is capable of discriminating whether NOMA is applied, based on the transmission method used for the data transmission and is capable of performing data decoding, based on the discrimination result.

As set forth hereinabove, according to the base station, the mobile station, the communication system, and the communication method, improvement of throughput may be achieved.

For example, in an environment where NOMA-enabled base station cells and NOMA-non-enabled base station cells are intermixed, NOMA-enabled mobile stations may be accommodated efficiently in the NOMA-enabled base station cells. Since more wireless resources may be used for NOMA transmission, the utilization efficiency of the wireless resources is improved, resulting in an effect of improved throughput overall. The mobile station is capable of discriminating whether a received wireless data signal has been transmitted in the NOMA scheme without the base station directly notifying the mobile station of information indicating whether the wireless data signal is transmitted in the NOMA scheme, every time a wireless data signal is transmitted. Therefore, the amount of wireless resources used for control signal transmission may be reduced.

According to an aspect of the present invention, an effect is achieved in that throughput is improved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A base station comprising:
    a controller configured to form a first cell supporting non-orthogonal multiple access wireless transmission for a plurality of mobile stations and generate a broadcast signal indicating that the non-orthogonal multiple access wireless transmission is supported in the first cell, the broadcast signal including a condition related to wireless quality between the base station and a mobile station, for performing the non-orthogonal multiple access wireless transmission in the first cell; and
    a transmitter configured to transmit the broadcast signal.

2. The base station according to claim 1, wherein the controller, by generating the broadcast signal broadcasting that the non-orthogonal multiple access wireless transmission is supported in the first cell, connects the mobile station more preferentially to the first cell than a second cell, the mobile station supporting the non-orthogonal multiple access wireless transmission and being positioned in the first cell that supports the non-orthogonal multiple access wireless transmission and in the second cell that is different from the first cell and does not support the non-orthogonal multiple access wireless transmission.

3. The base station according to claim 2, wherein the controller, by generating the broadcast signal broadcasting the condition relating to wireless quality, connects the mobile station to the first cell that supports the non-orthogonal multiple access wireless transmission, when the mobile station supports the non-orthogonal multiple access wireless transmission and has wireless quality with the base station satisfying the condition, the controller not connecting a mobile station to the first cell that supports the non-orthogonal multiple access wireless transmission, when the mobile station supports the non-orthogonal multiple access wireless transmission and has wireless quality with the base station not satisfying the condition.

4. The base station according to claim 1, wherein the controller generates the broadcast signal broadcasting a specific preamble signal to be transmitted to the base station by the mobile station that supports the non-orthogonal multiple access wireless transmission, among preamble signals in a random access procedure when the mobile station connects to the first cell that supports the non-orthogonal multiple access wireless transmission, and
    the controller selects the mobile station performing the non-orthogonal multiple access wireless transmission, based on whether a preamble signal transmitted in the random access procedure is the specific preamble signal.

5. The base station according to claim 4, wherein the controller, by generating the broadcast signal broadcasting the specific preamble signal, causes the mobile station that supports the non-orthogonal multiple access wireless transmission among mobile stations connecting to the first cell that supports the non-orthogonal multiple access wireless transmission, to transmit the specific preamble signal to the base station in the random access procedure.

6. The base station according to claim 4, wherein the controller generates the broadcast signal broadcasting the specific preamble signal grouped according to wireless quality between the base station and the mobile station, and
    the controller determines the wireless quality between the base station and the mobile station transmitting the specific preamble signal in the random access procedure, based on a group of the specific preamble signal transmitted in the random access procedure.

7. The base station according to claim 6, wherein the controller, by generating the broadcast signal broadcasting the specific preamble signal grouped according to wireless quality between the base station and the mobile station, causes the mobile station that supports the non-orthogonal multiple access wireless transmission to transmit in the random access procedure, a preamble signal of a group that corresponds to the wireless quality between the mobile station that supports the non-orthogonal multiple access wireless transmission and the base station, among the specific preamble signals.

8. The base station according to claim 1, wherein the controller generates the broadcast signal broadcasting a specific transmission method for the non-orthogonal multiple access wireless transmission in the first cell that supports the non-orthogonal multiple access wireless transmission, the specific transmission method including at least one of a frequency band and a communication scheme to be used, and
    the controller uses the specific transmission method for the non-orthogonal multiple access wireless transmission in the first cell that supports the non-orthogonal multiple access wireless transmission.

9. The base station according to claim 8, wherein the controller, by generating the broadcast signal broadcasting the specific transmission method, causes a mobile station that is a destination of transmission of data by the non-orthogonal multiple access wireless transmission in the first cell that supports the non-orthogonal multiple access wireless transmission, to decode the data by using a decoding scheme supporting the non-orthogonal multiple access wireless transmission.

10. A mobile station comprising:
- a receiver configured to receive a broadcast signal wirelessly transmitted from a base station forming a first cell supporting non-orthogonal multiple access wireless transmission for a plurality of mobile stations, the broadcast signal broadcasting that the non-orthogonal multiple access wireless transmission is supported in the first cell and a condition related to wireless quality between the base station and the mobile station, for performing the non-orthogonal multiple access wireless transmission in the first cell; and
- a transmitter configured to support the non-orthogonal multiple access wireless transmission, the transmitter connecting to a cell selected based on the broadcast signal received by the receiver, the transmitter performing wireless communication in the connected cell.

11. The mobile station according to claim 10, wherein within the first cell supporting the non-orthogonal multiple access wireless transmission and a second cell not supporting the non-orthogonal multiple access wireless transmission and different from the first cell, the transmitter connects to the first cell when the wireless quality between the mobile station and the base station satisfies the condition and connects to the second cell when the wireless quality between the mobile station and the base station does not satisfy the condition.

12. A communication system comprising:
- a base station forming a cell supporting non-orthogonal multiple access wireless transmission for a plurality of mobile stations, the base station transmitting a broadcast signal broadcasting that the non-orthogonal multiple access wireless transmission is supported in the cell and a condition related to wireless quality between the base station and a mobile station, for performing the non-orthogonal multiple access wireless transmission in the cell; and
- the mobile station that supports the non-orthogonal multiple access wireless transmission, the mobile station connecting to a cell selected based on the broadcast signal transmitted by the base station, the mobile station performing wireless communication in the connected cell.

* * * * *